US012627646B2

(12) United States Patent
Xiong et al.

(10) Patent No.: US 12,627,646 B2
(45) Date of Patent: May 12, 2026

(54) METHOD AND APPARATUS FOR ESTABLISHING TRANSPORT LAYER SECURITY PROTOCOL

(71) Applicant: GUANGDONG OPPO MOBILE TELECOMMUNICATIONS CORP., LTD., Dongguan (CN)

(72) Inventors: Lihui Xiong, Dongguan (CN); Lu Gan, Dongguan (CN); Jin Cao, Dongguan (CN); Chao Shang, Dongguan (CN); Xiongpeng Ren, Dongguan (CN); Ruhui Ma, Dongguan (CN); Hui Li, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 76 days.

(21) Appl. No.: 18/741,480

(22) Filed: Jun. 12, 2024

(65) Prior Publication Data

US 2024/0333700 A1      Oct. 3, 2024

Related U.S. Application Data

(63) Continuation of application No. PCT/CN2022/073731, filed on Jan. 25, 2022.

(51) Int. Cl.
*H04L 9/40* (2022.01)
(52) U.S. Cl.
CPC ............ *H04L 63/08* (2013.01); *H04L 63/166* (2013.01)

(58) Field of Classification Search
None
See application file for complete search history.

(56) References Cited

U.S. PATENT DOCUMENTS

| | | | | |
|---|---|---|---|---|
| 2021/0111953 A1* | 4/2021 | Hall | .................... | H04W 48/14 |
| 2022/0110022 A1* | 4/2022 | Featherstone | ......... | H04W 28/12 |
| 2022/0116774 A1* | 4/2022 | Rajadurai | ........... | H04W 12/041 |
| 2022/0240061 A1* | 7/2022 | Sodagar | ................. | H04W 4/20 |

(Continued)

FOREIGN PATENT DOCUMENTS

| | | |
|---|---|---|
| CN | 113796111 A | 12/2021 |
| WO | 2021135663 A1 | 7/2021 |
| WO | 2021167417 A1 | 8/2021 |

OTHER PUBLICATIONS

3GPP. "Study on Security Aspects of Enhancement of Support for Edge Computing in 5GC (Release 17) "3GPP TR 33.839 VO.6.0, section 6.3, dated Jun. 14, 2021.

(Continued)

*Primary Examiner* — Raqiul A Choudhury
(74) *Attorney, Agent, or Firm* — Quarles & Brady LLP

(57) ABSTRACT

Provided are a method and an apparatus for establishing a transport layer security protocol. The method includes: receiving, by an edge configuration server ECS, first negotiation request information from an edge enabler client EEC, where the first negotiation request information is used to indicate that the EEC supports a first authentication mode; and in a case that the ECS supports the first authentication mode, sending, by the ECS, first negotiation response information to the EEC, where the first negotiation response information is used to indicate that the ECS supports the first authentication mode.

11 Claims, 14 Drawing Sheets

(56)                     References Cited

U.S. PATENT DOCUMENTS

2023/0013720 A1*    1/2023   Gupta .................. H04W 88/18
2023/0247426 A1*    8/2023   Guo .................... H04W 12/041
                                                                726/6

OTHER PUBLICATIONS

"Adding evaluation for solution#26" of Apple, 3GPP TSG-SA3 Meeting #104-e-adhoc S3-213628 dated Oct. 4, 2021.

"Adding evaluation for solution#16" of Apple, 3GPP TSG-SA3 Meeting #104-e-adhoc S3-213358 dated Sep. 20, 2021.

PCT International Search Report for International Application No. PCT/CN2022/073731 dated Sep. 22, 2022.

PCT Written opinion for International Application No. PCT/CN2022/073731 dated Sep. 22, 2022.

"3rd Generation Partnership Project; Technical Specification Group Services and System Aspects; Security architecture and procedures for 5G system(Release 17)" of 3GPP TS 33.501 V 17.4.0 dated Dec. 2021.

"3rd Generation Partnership Project; Technical Specification Group Services and System Aspects; Architecture for enabling Edge Applications; (Release 17)" of 3GPP TS 23.558 V 17.2.0 dated Dec. 2021.

"3rd Generation Partnership Project; Technical Specification Group Services and System Aspects; Generic Authentication Architecture (GAA); Access to network application functions using Hypertext Transfer Protocol over Transport Layer Security (HTTPS) (Release 17)" of 3GPP TS 33.222 V 17.1.0 dated Dec. 2021.

* cited by examiner

100

200

METHOD AND APPARATUS FOR ESTABLISHING TRANSPORT LAYER SECURITY PROTOCOL

CROSS-REFERENCE TO RELATED APPLICATIONS

This application is a continuation of International Application No. PCT/CN2022/073731, filed on Jan. 25, 2022, the disclosure of which is hereby incorporated by reference in its entirety.

TECHNICAL FIELD

This application relates to the field of communication network security technologies, and more particularly, to a method and an apparatus for establishing a transport layer security protocol.

BACKGROUND

In some communication networks, secure and trusted data communication between an edge enabler client (EEC) and an edge configuration server (ECS) requires establishment of a transport layer security (TLS) protocol tunnel. Mutual authentication is required for the establishment of the TLS tunnel between the EEC and the ECS.

Current standards only specify which authentication modes can be used for mutual authentication between the EEC and the ECS, but do not further specify how to use these available authentication modes to achieve mutual authentication between the EEC and the ECS. In other words, the EEC and the ECS do not know how to achieve mutual authentication based on these authentication modes.

SUMMARY

This application provides a method and an apparatus for establishing a transport layer security protocol, to help achieve mutual authentication between an EEC and an ECS.

According to a first aspect, a method for establishing a transport layer security protocol is provided, including: receiving, by an edge configuration server ECS, first negotiation request information from an edge enabler client EEC, where the first negotiation request information is used to indicate that the EEC supports a first authentication mode; and in a case that the ECS supports the first authentication mode, sending, by the ECS, first negotiation response information to the EEC, where the first negotiation response information is used to indicate that the ECS supports the first authentication mode.

According to a second aspect, a method for establishing a transport layer security protocol is provided, including: sending, by an edge enabler client EEC, first negotiation request information to an edge configuration server ECS, where the first negotiation request information is used to indicate that the edge enabler client EEC supports a first authentication mode; and receiving, by the EEC, first negotiation response information from the ECS, where the first negotiation response information is used to indicate that the ECS supports the first authentication mode.

According to a third aspect, a method for establishing a transport layer security protocol is provided, including: receiving, by an edge enabler server EES, fifth authentication mode information and third key information from an edge configuration server ECS, where the fifth authentication mode information is used to indicate that a first EEC supports a first authentication mode, an authentication mode supported by the ECS includes the first authentication mode, an authentication mode supported by the EES includes the first authentication mode, the third key information is used to indicate identification information of a specific key in a first authentication network element, the specific key is a specific key obtained during a process in which the EEC performs authentication on the first authentication network element by using the first authentication mode, and the first authentication network element is configured to implement authentication that is based on the first authentication mode; and obtaining, by the EES, the specific key from the first authentication network element based on the third key information.

According to a fourth aspect, an apparatus for establishing a transport layer security protocol is provided, including: a receiving unit, configured to receive first negotiation request information from an edge enabler client EEC, where the first negotiation request information is used to indicate that the EEC supports a first authentication mode; and a sending unit, configured to: in a case that the apparatus supports the first authentication mode, send first negotiation response information to the EEC, where the first negotiation response information is used to indicate that the apparatus supports the first authentication mode.

According to a fifth aspect, an apparatus for establishing a transport layer security protocol is provided, including: a sending unit, configured to send first negotiation request information to an edge configuration server ECS, where the first negotiation request information is used to indicate that the edge enabler client EEC supports a first authentication mode; and a receiving unit, configured to receive first negotiation response information from the ECS, where the first negotiation response information is used to indicate that the ECS supports the first authentication mode.

According to a sixth aspect, an apparatus for establishing a transport layer security protocol is provided, including: a receiving unit, configured to receive fifth authentication mode information and third key information from an edge configuration server ECS, where the fifth authentication mode information is used to indicate that a first EEC supports a first authentication mode, an authentication mode supported by the ECS includes the first authentication mode, an authentication mode supported by the apparatus includes the first authentication mode, the third key information is used to indicate identification information of a specific key in a first authentication network element, the specific key is a specific key obtained during a process in which the EEC performs authentication on the first authentication network element by using the first authentication mode, and the first authentication network element is configured to implement authentication that is based on the first authentication mode; and an obtaining unit, configured to obtain the specific key from the first authentication network element based on the third key information.

According to a seventh aspect, an apparatus for establishing a transport layer security protocol is provided, including a memory and a processor, where the memory is configured to store a program, and the processor is configured to invoke the program in the memory to perform the method according to any one of the first aspect, the second aspect, or the third aspect.

According to an eighth aspect, an apparatus for establishing a transport layer security protocol is provided, including a processor, configured to invoke a program from a memory to perform the method according to any one of the first aspect, the second aspect, or the third aspect.

According to a ninth aspect, a chip is provided, including a processor, configured to invoke a program from a memory to cause a device installed with the chip to perform the method according to any one of the first aspect, the second aspect, or the third aspect.

According to a tenth aspect, a computer-readable storage medium is provided, where a program is stored on the computer-readable storage medium, and the program causes a computer to perform the method according to any one of the first aspect, the second aspect, or the third aspect.

According to an eleventh aspect, a computer program product is provided, including a program, where the program causes a computer to perform the method according to any one of the first aspect, the second aspect, or the third aspect.

According to a twelfth aspect, a computer program is provided, where the computer program causes a computer to perform the method according to any one of the first aspect, the second aspect, or the third aspect.

In embodiments of this application, the EEC and the ECS perform interaction with each other in relation to their respective supported authentication modes, so that authentication mode negotiation between the EEC and the ECS can be achieved, thereby facilitating establishment of a TLS connection between the EEC and the ECS, and further helping improve communication security between the EEC and the ECS.

Further, in embodiments of this application, mutual authentication can be achieved between the EEC and the ECS through a shared key corresponding to an authentication mode negotiated between the EEC and the ECS, so that a TLS connection can be established between the EEC and the ECS.

Alternatively, in embodiments of this application, mutual authentication can be achieved between the EEC and the ECS through both a shared key corresponding to an authentication mode negotiated between the EEC and the ECS and a certificate of the ECS, so that a TLS connection can be established between the EEC and the ECS.

Furthermore, in embodiments of this application, mutual authentication can be achieved between the EEC and the EES with the assistance of the ECS, thereby helping improve communication security between the EEC and the EES.

Furthermore, in embodiments of this application, in a case that the EES is updated, mutual authentication between the EEC and the updated EES can be achieved by the ECS, thereby helping ensure that the EES currently having a TLS connection to the EEC is an EES of higher quality or highest quality, and further helping ensure reliability of service implementation of the EEC.

DESCRIPTION OF EMBODIMENTS

The following describes the technical solutions in this application with reference to the accompanying drawings.

Figure 1:
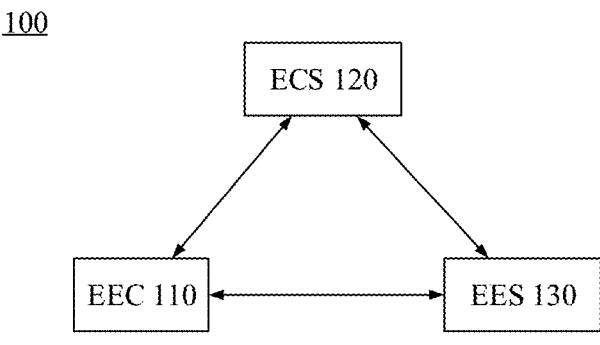
FIG. 1 is an example diagram of a communication system according to an embodiment of this application.

FIG. 1 shows a communication network in an embodiment of this application. The system 100 includes an EEC 110, an ECS 120, and an edge enabler server (EES) 130. The EEC 110 and the ECS 120 may communicate with each other, the ECS 120 and the EES 130 may communicate with each other, and the EEC 110 and the EES 130 may communicate with each other.

It may be understood that the system architecture shown in FIG. 1 is merely an example, and a communication system to which the method and the apparatus in embodiments of this application are applicable may further include other network elements, or may include more EECs, ECSs, or EESs.

In this embodiment, the EEC may refer to an edge enabler client deployed in a user equipment (UE), and has functions of retrieving configuration information and exchanging application data with an edge application server (EAS). The UE may also be referred to as a terminal device. The UE may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like.

In this embodiment, the ECS may refer to an edge configuration server, and has functions of providing edge configuration information (information for establishing a connection to the EES or information for distinguishing one EES from another EES) to the EEC and supporting registration of the EES.

In this embodiment, the EES may refer to an edge enabler server located in an edge data network, and has functions of interacting with a 3GPP core network, accessing a network, providing a profile to the EEC, and supporting registration of the EEC, and the like.

A TLS tunnel may be established between the EEC 110 and the ECS 120, that is, a TLS connection may be established between the EEC 110 and the ECS 120, so that secure transmission of information between the EEC 110 and the ECS 120 may be achieved.

When the EEC 110 establishes a TLS connection to the ECS 120, a TLS authentication mode based on a pre-shared key (PSK) may be used for mutual authentication. However, current standards only specify which TLS authentication modes can be used between the EEC 110 and the ECS 120, such as an authentication and key management for applications (AKMA) authentication mode or a generic bootstrapping architecture (GBA) authentication mode. It is unclear how to use a TLS authentication mode specified in the standards to achieve mutual authentication between the EEC 110 and the ECS 120. In addition, existing standards have not further clarified how to achieve mutual authentication between an EEC and an EES.

Based on the technical problems, this application proposes a method for establishing TLS and a related apparatus, to help achieve mutual authentication between the EEC 110 and the ECS 120. Further, the method for establishing TLS and the related apparatus proposed in this application further facilitate achieving mutual authentication between the EEC and the EES.

Figure 2:
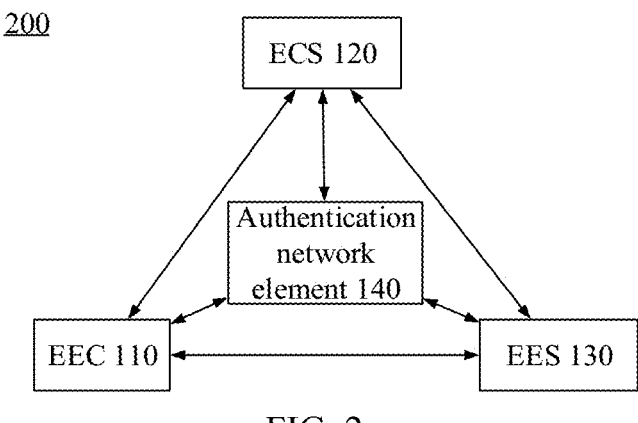
FIG. 2 is an example diagram of a communication system according to another embodiment of this application.

FIG. 2 is an example architectural diagram of a communication network system according to an embodiment of this application. The system 200 shown in FIG. 2 may include an EEC 110, an ECS 120, an EES 130, and an authentication network element 140. Each of the EEC 110, the ECS 120, and the EES 130 may communicate with the authentication network element 140 to achieve authentication, respectively.

In an example, the authentication network element 140 may be configured to implement authentication in an AKMA mode. For example, the authentication network element 140 may be an AKMA anchor function (AAnF) network element.

In another example, the authentication network element 140 may be configured to implement authentication in a GBA mode. For example, the authentication network element 140 may be a bootstrapping server function (BSF) network element.

In a method for mutual authentication between an EEC and an ECS provided in this application, the EEC notifies the ECS that the EEC supports a first authentication mode, and the ECS determines whether the ECS itself also supports the first authentication mode.

If the ECS also supports the first authentication mode, the EEC may be notified that the ECS also supports the first authentication mode. In this case, it means that the authentication mode is successfully negotiated between the EEC and the ECS.

If the ECS does not support the first authentication mode, the EEC may be notified that the ECS does not support the first authentication mode, or the EEC may be directly notified that authentication mode negotiation fails. In a case that the ECS notifies the EEC that the ECS does not support the first authentication mode, the EEC may determine, based on the notification, that the authentication mode negotiation between the EEC and the ECS fails.

In the method for mutual authentication between the EEC and the ECS, in addition to the negotiation of the authentication mode, a specific key may be further obtained based on the negotiated first authentication mode, to generate a TLS pre-master key.

In a possible implementation, when the EEC notifies the ECS that the EEC supports the first authentication mode, the EEC further notifies the ECS of first identification information of a first specific key obtained by performing authentication on an authentication network element based on the first authentication mode by the EEC. In this case, in a case that the ECS determines that the authentication mode negotiation is successful, it obtains the first specific key from the authentication network element based on the first identification information, and generates a TLS pre-master key based on the first specific key.

In a possible implementation, when the ECS notifies the EEC that the ECS also supports the first authentication mode, it further notifies the EEC of certificate information of the ECS. In a case that the EEC verifies that the certificate information notified by the ECS is consistent with certificate information configured on the EEC, the EEC obtains first digest information by using the first identification information of the first specific key obtained by performing authentication on the authentication network element based on the first authentication mode by the EEC as a user name and the first specific key as a password, and notifies the ECS of the first digest information and the first identification information. After receiving the first digest information and the first identification information, the ECS obtains a specific key from the authentication network element based on the first identification information, and obtains digest information by using the first identification information as the user name and the specific key as the password. In a case that the digest information is consistent with the first digest information, the ECS determines that the specific key is the first specific key, and generates the TLS pre-master key based on the first specific key.

In this application, after obtaining the first specific key, the EEC may also generate the TLS pre-master key based on the first specific key.

In a case that the EEC and the ECS obtain the first specific key, it may be considered that a TLS tunnel or a TLS connection is already established between the EEC and the ECS.

Alternatively, in a case that the EEC and the ECS obtain the pre-master key based on the first specific key, it may be considered that a TLS tunnel or a TLS connection is already established between the EEC and the ECS.

Figure 3:
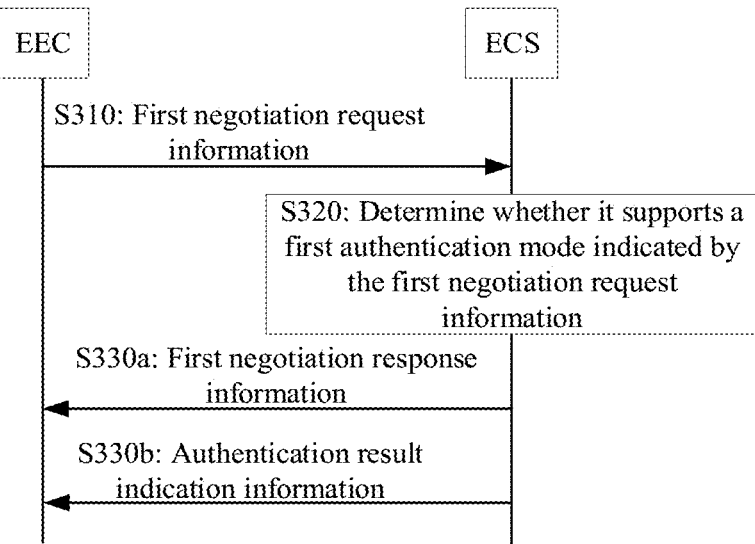
FIG. 3 is an example flowchart of a method for mutual authentication between an EEC and an ECS according to an embodiment of this application.

FIG. 3 is an example flowchart of a method for mutual authentication between an EEC and an ECS according to an embodiment of this application. As shown in FIG. 3, the method may include S310, S320, S330a, and S330b. Either of S330a and S330b is performed.

In an example, the EEC in this embodiment may be the EEC 110 in the system shown in FIG. 2, the ECS in this embodiment may be the ECS 120 in the system shown in FIG. 2, and an authentication network element in this embodiment may be the authentication network element 140 in the system shown in FIG. 2.

S310: The EEC sends first negotiation request information to the ECS, where the first negotiation request information is used to indicate that the EEC supports a first authentication mode. Correspondingly, the ECS receives the first negotiation request information.

It may be understood that, before S310 is performed, an address of the ECS may be preconfigured on the EEC, or is already discovered by the EEC. An example of the address of the ECS includes a uniform resource identifier (URI) of the ECS.

In this embodiment, the EEC may use a PSK-based TLS authentication mode, and authentication modes included in the TLS authentication modes supported by the EEC may be preconfigured on the EEC. The authentication mode in this embodiment may also be referred to as an authentication algorithm or an authentication algorithm capability.

It may be understood that there may be one or more TLS authentication modes supported by the EEC. For example, the TLS authentication mode supported by the EEC may include an AKMA-based authentication mode, or a BSF-based authentication mode, or both an AKMA-based authentication mode and a BSF-based authentication mode.

When the EEC establishes an TLS connection to the ECS, the EEC may select an authentication mode from the authentication modes supported by the EEC.

In an example, priorities are set for the authentication modes supported by the EEC, and the EEC selects an authentication mode based on the priorities of the authentication modes. For example, an authentication mode with the highest priority may be selected.

For ease of description, in this embodiment, the authentication mode selected by the EEC from the TLS authentication modes supported by the EEC is referred to as a first authentication mode.

After the EEC selects the authentication mode, it may send information to the ECS to notify the ECS that the EEC supports the first authentication mode. In this embodiment, the information used to indicate that the EEC supports the first authentication mode is referred to as first negotiation request information.

In an example, when the first authentication mode includes a GBA-based authentication mode, the first negotiation request information may include indication information such as "3GPP-bootstrapping-uicc", "3GPP-bootstrapping", or "3GPP-bootstrapping-digest" to indicate that the first authentication mode supported by the EEC is an GBA-based authentication mode.

In another example, when the first authentication mode includes the AKMA-based authentication mode, the first negotiation request information may include indication information such as "3GPP-AKMA" to indicate that the first authentication mode supported by the EEC is a AKMA-based authentication mode.

Optionally, when the EEC sends the first authentication mode to the ECS, it may further send, to the ECS, related information of a UE to which the EEC may pertain, which may include, for example, one or more of the following information: identification information of the UE, a generic public subscription identifier (GPSI), connectivity information, location information, and application client profile (AC profile) information.

S320: The ECS determines whether it supports the first authentication mode indicated by the first negotiation request information. If it supports the first authentication mode, S330*a* is performed; otherwise, S330*b* is performed.

For example, after receiving the first negotiation request information and knowing, based on the first negotiation request information, that the EEC supports the first authentication mode, the ECS may determine, based on authentication mode information locally configured in the ECS, whether it supports the first authentication mode.

In an example, if the authentication mode information locally configured in the ECS includes the first authentication mode, it may be determined that the ECS supports the first authentication mode; otherwise, it may be determined that the ECS does not support the first authentication mode.

For example, when the first negotiation request information includes "3GPP-bootstrapping-uicc", "3GPP-bootstrapping", or "3GPP-bootstrapping-digest", if the authentication mode information locally configured in the ECS also includes the same information, it may be determined that the ECS supports the first authentication mode.

For another example, when the first negotiation request information includes "3GPP-AKMA", if the authentication mode information locally configured in the ECS also includes the same information, it may be determined that the ECS supports the first authentication mode.

In a case that the ECS also supports the first authentication mode, it indicates that the ECS and the EEC may use the first authentication mode to achieve mutual authentication. In other words, authentication mode negotiation between the ECS and the EEC is successful, and the negotiated authentication mode is the first authentication mode.

In a case that the ECS does not support the first authentication mode, it indicates that the ECS and the EEC cannot use the first authentication mode to achieve mutual authentication. In other words, authentication mode negotiation between ECS and EEC fails.

S330*a*: The ECS sends first negotiation response information to the EEC, where the first negotiation response information is used to indicate that the ECS supports the first authentication mode. Correspondingly, the EEC receives the first negotiation response information.

In this case, it is indicated that the authentication mode negotiation between the EEC and the ECS is completed and successful.

In an example, when the first authentication mode includes a GBA-based authentication mode, the first negotiation response information may include indication information such as "3GPP-bootstrapping-uicc", "3GPP-bootstrapping", or "3GPP-bootstrapping-digest".

In another example, when the first authentication mode includes an AKMA-based authentication mode, the first negotiation response information may include indication information such as "3GPP-AKMA".

S330*b*: The ECS sends authentication result indication information to the EEC, where the authentication result indication information is used to indicate that the authentication mode negotiation between the ECS and the EEC fails.

In this case, optionally, the ECS may further send indication information to the EEC to notify that an authentication mode that fails in the negotiation is the first authentication mode.

In this embodiment, the EEC notifies the ECS that the authentication mode supported by the EEC includes the first authentication mode, and the ECS responds to the EEC on whether to employ the first authentication mode by determining whether the ECS itself supports the first authentication mode, so that authentication mode negotiation between the EEC and the ECS can be achieved, thereby assisting the EEC and the ECS in achieving authentication through the first authentication mode, that is, facilitating mutual authentication between the EEC and the ECS.

The embodiment shown in FIG. 3 may be referred to as authentication mode negotiation between the EEC and the ECS. The following describes implementations of mutual authentication between the EEC and the ECS based on the method shown in FIG. 3.

Figure 4:
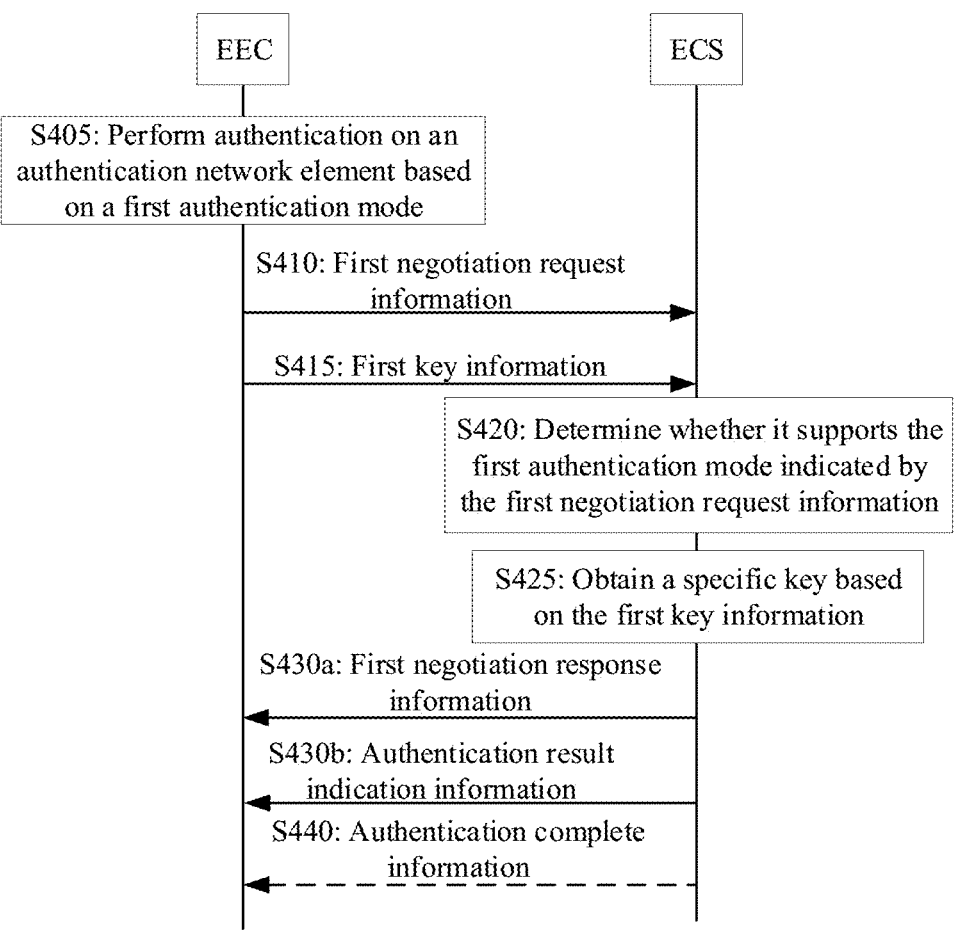
FIG. 4 is a schematic flowchart of a method for mutual authentication between an EEC and an ECS according to another embodiment of this application.

FIG. 4 is an example flowchart of a method for mutual authentication between an EEC and an ECS according to an embodiment of this application. As shown in FIG. 4, the method may include S405, S410, S415, S420, S425, S430*a*, S430*b*, and S440. Either of S430*a* and S430*b* is performed, and S440 is an optional step.

S405: The EEC performs authentication on an authentication network element based on a first authentication mode to obtain a specific key and identification information of the specific key, where the authentication network element is configured to implement authentication that is based on the first authentication mode.

In an example, the authentication network element is the authentication network element 140 in the system shown in FIG. 2.

In this embodiment, the identification information of the specific key may be identification information of the specific key on the authentication network element, that is, the specific key may be obtained from the authentication network element by using the identification information.

For example, when the first authentication mode is an AKMA-based authentication mode, the EEC may perform an AKMA authentication process with an AAnF network element, and obtain a specific key "KAF" and identification information "AKMA key identifier (A-KID)" of the specific key.

For another example, when the first authentication mode is a GBA-based authentication mode, the EEC may perform a bootstrapping process with a BSF network element, and obtain a specific key "Ks_ext_NAF" or "Ks_int_NAF", and identification information "bootstrapping transaction identifier (B-TID)" of the specific key.

Optionally, during a process of performing authentication on the authentication network element based on the first authentication mode, the EEC may obtain one or more specific keys and identification information of each specific key.

S410: The EEC sends first negotiation request information to the ECS, where the first negotiation request information is used to indicate that the EEC supports the first authentication mode. Correspondingly, the ECS receives the first negotiation request information.

For this step, reference may be made to S310, and details are not described herein again.

S415: The EEC sends first key information to the ECS, where the first key information includes the identification information of the specific key. Correspondingly, the ECS receives the first key information.

It may be understood that the first negotiation request information and the first key information can be carried in a same message or in separate messages.

When the first negotiation request information and the first key information are carried in a same message, in an example, the message may be "ClientHello Message".

In an example, when the first authentication mode is an AKMA-based authentication mode, the first key information may include identification information "A-KID" of a specific key.

In another example, when the first authentication mode is a GBA-based authentication mode, the first key information may include identification information "B-TID" of a specific key.

In a case that the EEC obtains only one specific key in S405, the identification information in the first key information is the identification information of the specific key.

In a case that the EEC obtains a plurality of specific keys in S405, the identification information in the first key information may be identification information of one of the plurality of specific keys, or identification information of a part of the plurality of specific keys, or identification information of all of the plurality of specific keys.

When the identification information indicated by the first key information is identification information of a part of the plurality of specific keys, this part of specific keys may be selected according to a preset rule.

In an example, the preset rule may be random selection. In another example, the preset rule may be: selecting one or more keys with higher priorities based on priorities of the plurality of specific keys.

S420: The ECS determines whether it supports the first authentication mode indicated by the first negotiation request information. If it supports the first authentication mode, S425 and S430*a* are performed; otherwise, S430*b* is performed.

For implementation of this step, reference may be made to S320, and details are not described herein again.

S425: The ECS obtains a specific key based on the first key information.

Specifically, the ECS obtains, based on the first authentication mode and the first key information, the specific key indicated by the identification information in the first key information.

If there is one piece of identification information in the first key information, in an example, the ECS may obtain a specific key from the authentication network element of the first authentication mode based on the identification information.

If there are a plurality of pieces of identification information in the first key information, in an example, the ECS may first select one piece of identification information from the plurality of pieces identification information, and then obtain a specific key from the authentication network element of the first authentication mode based on the one piece of identification information.

For example, when the first authentication mode is an AKMA-based authentication mode, the ECS may obtain a specific key "KAF" from the AAnF network element based on identification information "A-KID".

For another example, when the first authentication mode is a GBA-based authentication mode, the ECS may obtain a specific key "Ks_ext_NAF" or "Ks_int_NAF" from the BSF network element based on identification information "B-TID".

S430*a*: The ECS sends first negotiation response information to the EEC, where the first negotiation response information is used to indicate that the ECS supports the first authentication mode. Correspondingly, the EEC receives the first negotiation response information.

For this step, reference may be made to S330*a* in FIG. 3, and details are not described herein again.

S430*b*: The ECS sends authentication result indication information to the EEC, where the authentication result indication information is used to indicate that authentication mode negotiation between the ECS and the EEC fails.

For this step, reference may be made to S430*a* in FIG. 3, and details are not described herein again.

In this embodiment, the EEC performs authentication on the authentication network element and obtains a specific key, and the ECS obtains the specific key from the authentication network element based on identification information of the specific key notified by the EEC, so that mutual authentication between the EEC and the ECS can be achieved. In this application, such an authentication mode is referred to as PSK mutual authentication based on a shared TLS key.

In this embodiment, optionally, S415 and S425 may be performed after S430*a*. For example, S415 and S425 are performed sequentially only in a case that the EEC receives the first negotiation response information in S430*a* and learns, based on the first negotiation response information, that the authentication mode between the EEC and the ECS is successfully authenticated.

In this embodiment, in a case that S415 and S425 are performed after S430*a*, S405 may also be performed after S430*a*. For example, S405, S415, and S425 are performed sequentially only in a case that the EEC receives the first negotiation response information in S430*a* and learns, based on the first negotiation response information, that the authentication mode between the EEC and the ECS is successfully authenticated.

In this embodiment, optionally, after S430 is performed, S440 may be further included, that is, the EEC sends authentication complete information to the ECS, where the authentication complete information is used to indicate that the authentication is completed.

Figure 5:
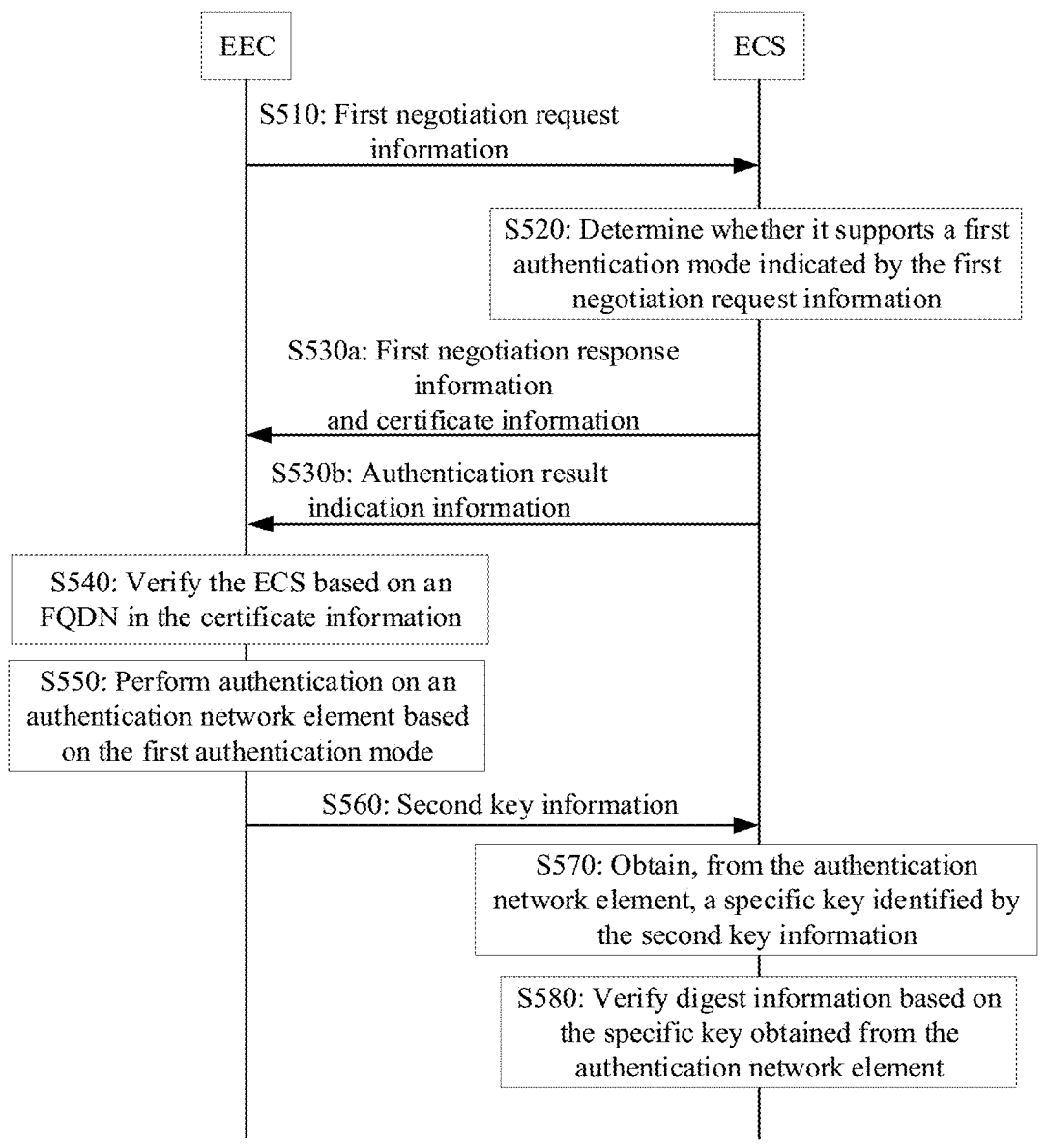
FIG. 5 is a schematic flowchart of a method for mutual authentication between an EEC and an ECS according to still another embodiment of this application.

FIG. 5 is an example flowchart of a method for mutual authentication between an EEC and an ECS according to another embodiment of this application. As shown in FIG. 5, the method may include S510, S520, S530*a*, S530*b*, S540, S550, S560, S570, and S580. Either of S530*a* and S530*b* is performed, and the steps after S530 are all performed on the basis of S530.

S510: The EEC sends first negotiation request information to the ECS, where the first negotiation request information is used to indicate that the edge enabler client EEC supports a first authentication mode. Correspondingly, the ECS receives the first negotiation request information.

For this step, reference may be made to S310, and details are not described herein again.

S520: The ECS determines whether it supports the first authentication mode indicated by the first negotiation request information. If it supports the first authentication mode, S530*a* is performed; otherwise, S530*b* is performed.

In this step, for an implementation in which the ECS determines whether it supports the first authentication mode indicated by the first negotiation request information, reference may be made to the related content in S320, and details are not described herein again.

S530*a*: The ECS sends first negotiation response information and certificate information to the EEC, where the first negotiation response information is used to indicate that the ECS supports the first authentication mode, and the certificate information includes a fully qualified domain name (FQDN) of the ECS. Correspondingly, the EEC receives the first negotiation response information and the certificate information.

For this step, reference may be made to S330*a*, and details are not described herein again.

Optionally, the certificate information and the first negotiation response information may be carried in a same message or in separate messages.

S530*b*: The ECS sends authentication result indication information to the EEC, where the authentication result indication information is used to indicate that authentication mode negotiation between the ECS and the EEC fails.

For this step, reference may be made to S330*b*, and details are not described herein again.

S540: The EEC verifies the ECS based on the FQDN in the certificate information. If the verification is successful, S550 is performed.

In an implementation, an FQDN is recorded in a URL of the EEC, and the EEC can verify whether the FQDN in the URL matches the FQDN in the certificate information. If they match, the verification is successful; otherwise, the verification fails.

S550: The EEC performs authentication on an authentication network element based on the first authentication mode to obtain a specific key and identification information of the specific key, where the authentication network element is configured to implement authentication that is based on the first authentication mode.

For this step, reference may be made to S405, and details are not described herein again.

S560: The EEC sends second key information to the ECS, where the second key information includes identification information of a specific key on the authentication network element and digest information, where the digest information is generated by using the identification information as a user name and the specific key as a password. Correspondingly, the ECS receives the second key information.

In a case that the EEC obtains a plurality of specific keys in S550, the identification information in the second key information may be identification information of one of the plurality of specific keys, or identification information of a part of the plurality of specific keys, or identification information of all of the plurality of specific keys.

Correspondingly, the digest information includes digest information generated by using identification information of each specific key in the second key information as the user name and this specific key as the password.

The specific key indicated by the second key information may be selected, according to a preset rule, from specific keys obtained by the EEC from the authentication network element.

In an example, the preset rule may be random selection. In another example, the preset rule may be: selecting one or more keys with higher priorities based on priorities of the plurality of specific keys.

S570: The ECS obtains, from the authentication network element, the specific key identified by the second key information.

For this step, reference may be made to S425, and details are not described herein again. That is, the identification information in the first key information in S425 is replaced with the identification information in the second key information.

S580: The ECS verifies the digest information based on the specific key obtained from the authentication network element.

Specifically, the ECS generates digest information by using the identification information in the second key information as the user name and the specific key obtained by the ECS from the authentication network element as the password, and compares the digest information with digest information in the second key information. If they are consistent, the verification is successful; or if they are inconsistent, the verification fails.

If the verification is successful, it indicates that mutual authentication between the ECS and EEC is successful; otherwise, it indicates that authentication between the ECS and EEC fails.

In the embodiment shown in any one of FIG. 3 to FIG. 5, the EEC may generate a TLS pre-master key PSK based on a specific key. In embodiments, time for the EEC to derive the TLS pre-master key PSK based on the specific key is not limited. For example, the EEC may generate the TLS pre-master key PSK immediately after the specific key is obtained, or only after the first negotiation response information is received, or only in a subsequent communication process.

In the embodiment shown in any one of FIG. 3 to FIG. 5, the ECS may generate a TLS pre-master key PSK based on a specific key. In embodiments, time for the ECS to derive the TLS pre-master key PSK based on the specific key is not limited. For example, the ECS may generate the TLS pre-master key PSK immediately after the specific key is obtained, or only after the authentication complete information is received, or only in a subsequent communication process.

In this embodiment, the ECS notifies the EEC of the certificate information of the ECS, so that the EEC can perform authentication on the ECS based on the certificate information, and then the EEC sends the identification information of the specific key and corresponding digest information to the ECS, so that the ECS completes the authentication based on the identification information and the digest information, thereby achieving mutual authentication between the EEC and the ECS.

The mutual authentication process between the EEC and the ECS is described above. The following describes a mutual authentication process between an EEC and an EES. In a method for mutual authentication between an EEC and an EES provided in this application, after learning that the EEC supports a first authentication mode, an ECS selects, for the EEC, an EES supporting the first authentication mode. If the selection is successful, the EEC is notified of the EES selected for it, and the EES is notified of identification information of a specific key obtained by the EEC by performing authentication by using the first authentication mode, so that the EES can obtain the specific key based on the identification information.

There are a plurality of implementations in which the ECS selects, for the EEC, an EES supporting the first authentication mode. An example description is given below.

In a possible implementation, configuration information of one or more EESs is configured on the ECS, and the configuration information includes an authentication mode supported by each EES. In this case, the ECS selects, based on the configuration information, an EES supporting the first authentication mode as an EES for the EEC. For ease of description, the EES selected by the ECS for the EEC is referred to as a first EES in this application.

If there are a plurality of EESs supporting the first authentication mode, the ECS may further select, as the first EES from the plurality of EESs based on other information, an EES that can provide higher service quality or even the highest service quality for the EEC.

For example, the ECS may obtain location information of the EEC, and select an EES closest to the EEC from the EESs based on the location information as the first EES.

In another possible implementation, the ECS may notify the EES that the EEC supports the first authentication mode, and allows the EES to feed back, to the ECS based on an authentication mode supported by the EES, whether the EES supports the first authentication mode.

In a case that the EES feeds back, to the ECS, that the EES supports the first authentication mode, the ECS may select the EES as the first EES.

In a case that the EES feeds back, to the ECS, that the EES does not support the first authentication mode, in some implementations, the ECS may determine that authentication mode negotiation between the EEC and the EES fails, and notify the EEC of the negotiation result. For example, in a case that no EES supports the first authentication mode, the ECS may determine that the authentication mode negotiation between the EEC and the EES fails.

In a case that the EES feeds back, to the ECS, that the EES does not support the first authentication mode, in some other implementations, the ECS queries another EES whether it supports the first authentication mode.

In this application, a second specific key, which is notified by the ECS to the EES and obtained by the EEC performing authentication with the use of the first authentication mode, may be the same as or different from a first specific key obtained by the ECS.

In this application, there are a plurality of manners in which the ECS notifies the EES of the second specific key obtained by the EEC performing authentication with the use of the first authentication mode. An example description is given below.

In a possible implementation, the EEC sends second identification information of the second specific key to the ECS, and the ECS forwards the second identification information to the EES. In this implementation, the EES obtains the second specific key from an authentication network element based on the second identification information, and generates a second TLS pre-master key based on the second specific key.

In another possible implementation, the EEC sends second digest information generated by using the second identification information of the second specific key as a user name and the second specific key as a password and the second identification information to the ECS, and the ECS forwards the second identification information and the second digest information to the EES. The EES obtains a specific key from the authentication network element based on the second identification information, generates digest information by using the second identification information as the user name and the specific key as the password, and compares the digest information with the second digest information. If they are consistent, the specific key may be used as the second specific key, and a second TLS pre-master key may be generated based on the second specific key.

Figure 6:
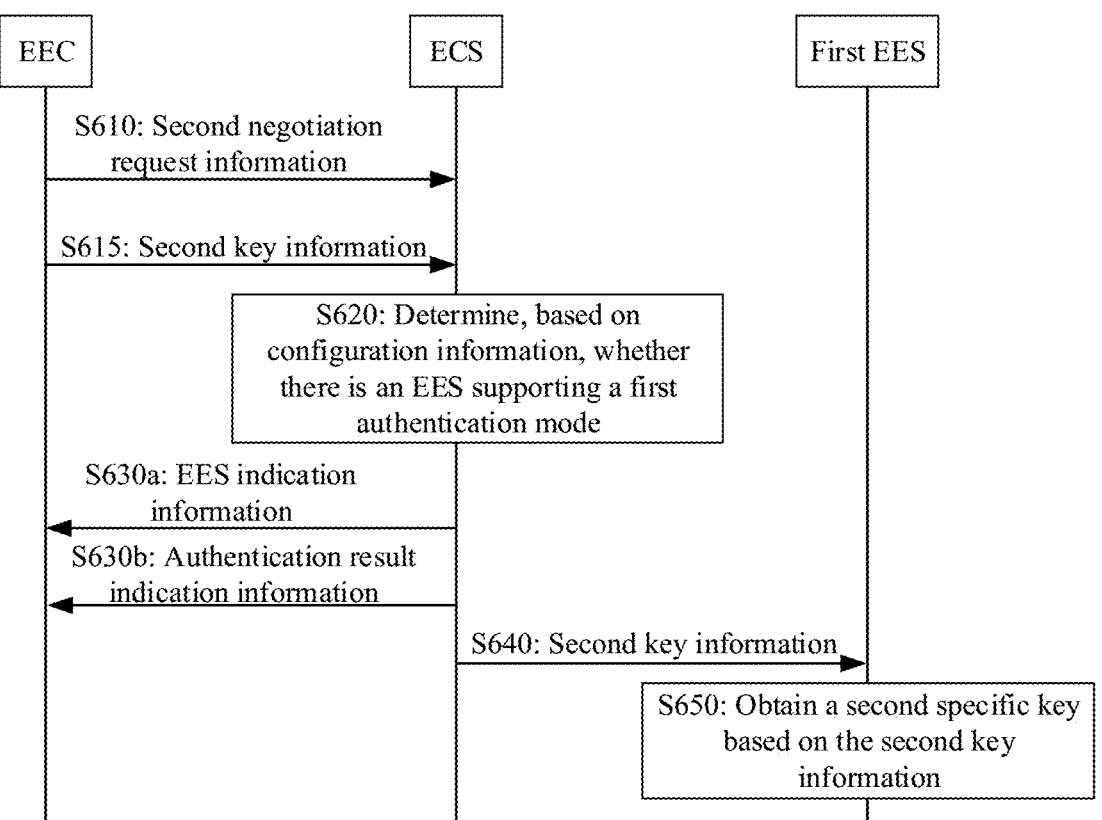
FIG. 6 is a schematic flowchart of a method for mutual authentication between an EEC and an EES according to still another embodiment of this application.

FIG. 6 is example flowchart of a method for mutual authentication between an EEC and an EES according to an embodiment of this application. In the method, the ECS uses the foregoing first possible implementation, as shown in FIG. 6. The method may include steps S610, S615, S620, S630a, S630b, S640, and S650. Either of S630a and S630b is performed.

S610: The EEC sends second negotiation request information to the ECS, where the second negotiation request information is used to indicate that the EEC supports a first authentication mode. Correspondingly, the ECS receives the second negotiation request information.

For the first authentication mode in this step, reference may be made to the related content of the first authentication mode in the method shown in FIG. 3. For the second negotiation request information, reference may be made to the related content of the first negotiation request information in the method shown in FIG. 3. Details are not described herein again.

S615: The EEC sends second key information to the ECS, where the second key information is used to indicate a second specific key, and the second specific key is a specific key obtained during a process in which the EEC performs authentication on an authentication network element by using the first authentication mode.

For the second specific key in this step, reference may be made to the related content of the first specific key in the method shown in FIG. 3. For the second key information, reference may be made to the related content of the first key information in the method shown in FIG. 3. Details are not described herein again.

In an example, the second key information may include second identification information of the second specific key in the authentication network element. Second specific key In another example, the second key information may include second digest information generated by using the second identification information as a user name and the second specific key as a password, and include the second identification information.

S620: The ECS determines, based on configuration information, whether there is an EES supporting the first authentication mode. If there is an EES supporting the first authentication mode, S630a is performed; or if there is no EES supporting the first authentication mode, S630b is performed.

For this step, reference may be made to the first possible implementation in which the ECS selects, for the EEC, an EES supporting the first authentication mode. Details are not described herein again.

S630a: The ECS sends EES indication information to the EEC, where the EES indication information is used to indicate a first EES, where the first EES is an EES supporting the first authentication mode.

In an example, the EES indication information may include address information of the first EES.

S630b: The ECS sends authentication result indication information to the EEC, where the authentication result indication information is used to indicate that authentication mode negotiation between the EES and the EEC fails.

S640: The ECS sends the second key information to the first EES. Correspondingly, the first EES receives the second key information.

S650: The first EES obtains the second specific key based on the second key information.

For implementation of this step, reference may be made to the related content of obtaining the first specific key by the ECS based on the first key information in the method shown in FIG. 3, and details are not described herein again.

Figure 7:
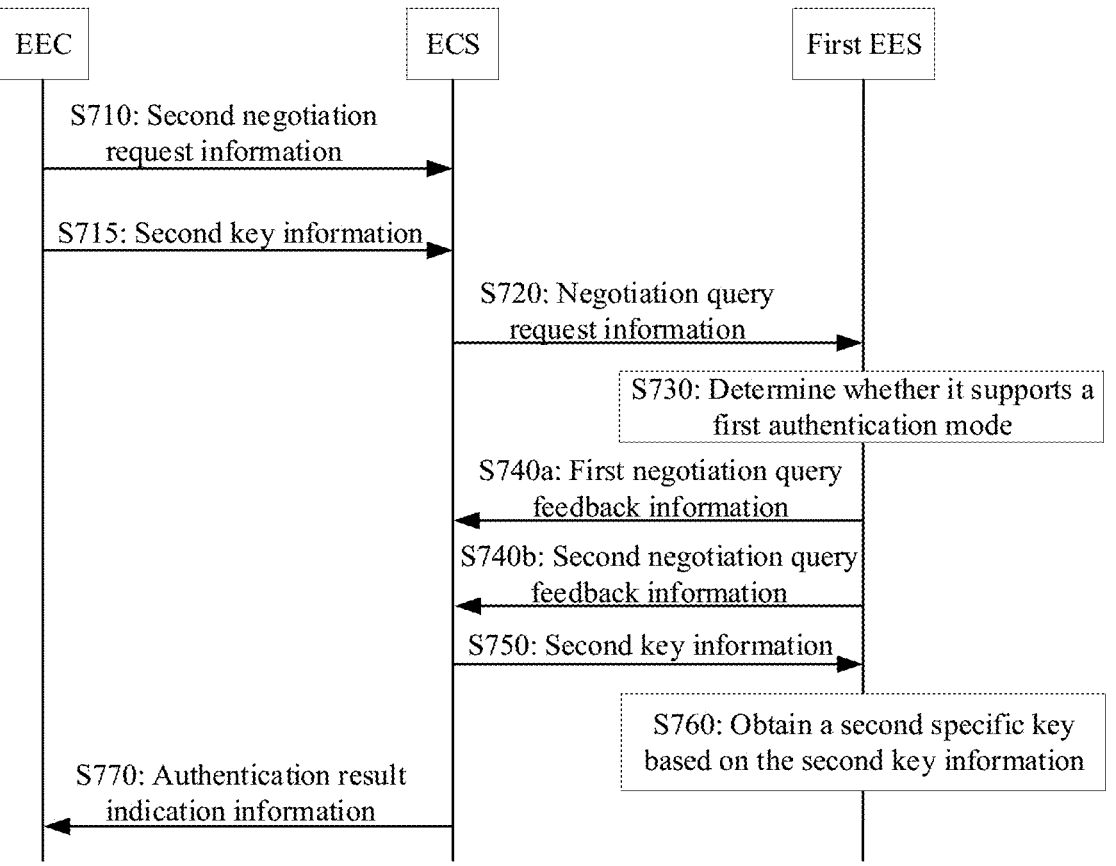
FIG. 7 is a schematic flowchart of a method for mutual authentication between an EEC and an EES according to still another embodiment of this application.

FIG. 7 is example flowchart of a method for mutual authentication between an EEC and an EES according to an embodiment of this application. In the method, an ECS uses the foregoing first possible implementation, as shown in FIG. 7. The method may include steps S710, S715, S720, S730, S740a, S740b, S750, S760, and S770. Either of S740a and S740b is performed.

S710: The EEC sends second negotiation request information to the ECS, where the second negotiation request information is used to indicate that the EEC supports a first authentication mode. Correspondingly, the ECS receives the second negotiation request information.

For the first authentication mode in this step, reference may be made to the related content of the first authentication mode in the method shown in FIG. 3. For the second negotiation request information, reference may be made to the related content of the first negotiation request information in the method shown in FIG. 3. Details are not described herein again.

S715: The EEC sends second key information to the ECS, where the second key information is used to indicate a second specific key, and the second specific key is a specific key obtained during a process in which the EEC performs authentication on an authentication network element by using the first authentication mode.

For the second specific key in this step, reference may be made to the related content of the first specific key in the method shown in FIG. 3. For the second key information, reference may be made to the related content of the first key information in the method shown in FIG. 3. Details are not described herein again.

In an example, the second key information may include second identification information of the second specific key in the authentication network element. Second specific key In another example, the second key information may include second digest information generated by using the second identification information as a user name and the second specific key as a password, and include the second identification information.

S720: The ECS sends negotiation query request information to a first EES, where the negotiation query request information is used to indicate that the EEC supports the first authentication mode. Correspondingly, the first EES receives the negotiation query request information.

For an implementation in which the negotiation query request information indicates the first authentication mode, reference may be made to the implementation in which the first negotiation request information indicates the first authentication mode. Details are not described herein again.

S730: The first EES determines whether it supports the first authentication mode. If it supports the first authentication mode, S740a is performed; otherwise, S740b is performed.

S740a: The first EES sends first negotiation query feedback information to the ECS, where the first negotiation query feedback information is used to indicate that the first EES supports the first authentication mode. Correspondingly, the ECS receives the first negotiation query feedback information.

S740b: The first EES sends second negotiation query feedback information to the ECS, where the second negotiation query feedback information is used to indicate that the first EES does not support the first authentication mode, or is used to indicate that authentication mode negotiation between the first EES and the EEC fails. Correspondingly, the ECS receives the second negotiation query feedback information.

S750: The ECS sends the second key information to the first ESS. Correspondingly, the first EES receives the second key information.

S760: The first EES obtains the second specific key based on the second key information.

S770: The ECS sends authentication result indication information to the EEC, where the authentication result indication information is used to indicate that authentication mode negotiation between the EEC and the EES fails.

For implementation of this step, reference may be made to the related content of obtaining the first specific key by the ECS based on the first key information in the method shown in FIG. 3, and details are not described herein again.

In this embodiment, S770 is performed only in a case that S740b is performed. S750 and S760 are performed only in a case that S740a is executed.

Optionally, S715 may alternatively be performed between S740a and S750.

In the embodiment shown in FIG. 6 or FIG. 7, the EEC may generate a TLS pre-master key PSK based on a specific key. In embodiments, time for the EEC to derive the TLS pre-master key PSK based on the specific key is not limited. For example, the EEC may generate the TLS pre-master key PSK immediately after the specific key is obtained, or only after the first negotiation response information is received, or only in a subsequent communication process.

In the embodiment shown in FIG. 6 or FIG. 7, the ECS may generate a TLS pre-master key PSK based on a specific key. In embodiments, time for the ECS to derive the TLS pre-master key PSK based on the specific key is not limited. For example, the ECS may generate the TLS pre-master key PSK immediately after the specific key is obtained, or only after the authentication complete information is received, or only in a subsequent communication process.

A method for establishing a transport layer security protocol provided in an embodiment of this application may include the method shown in any one of FIG. 3 to FIG. 7, or may include the method shown in any one of FIG. 3 to FIG. 5 and the method shown in either of FIG. 6 and FIG. 7.

For example, in a possible implementation, a method for establishing a transport layer security protocol provided in an embodiment of this application may include the methods shown in FIG. 4 and FIG. 6.

For another example, in another possible implementation, a method for establishing a transport layer security protocol provided in an embodiment of this application may include the methods shown in the figure and FIG. 6.

This application further proposes a method for establishing a transport layer security protocol in a case that an EES associated with an ECS is updated.

In an example, a case that an EES associated with an ECS is updated may include: a new EES is registered on the ECS.

In an example, a case that an EES associated with an ECS is updated may include: an original EES is deregistered and then re-registered.

In an example, a case that an EES associated with an ECS is updated may include: an authentication mode supported by an original EES changes.

In a case that the EES associated with the ECS is updated, the ECS may reselect, based on the first authentication mode supported by the EEC, an EES that provides a service for the EEC, and notify the EEC of related information about the reselected EES (such as address information, where the EES also supports the first authentication mode), so that mutual authentication can be achieved between the EEC and the EES through related steps in the foregoing related method for authentication between the EEC and the EES.

For example, mutual authentication can be achieved between the EEC and the EES through related steps in the related method for authentication between the EEC and the EES in the method shown in FIG. 6 or FIG. 7.

It may be understood that, in a case that the EES reselected by the ECS for the EEC is the same as the previous EES and the EES also supports the first authentication mode, there is no need to trigger mutual authentication between the EEC and the EES.

Figure 8:
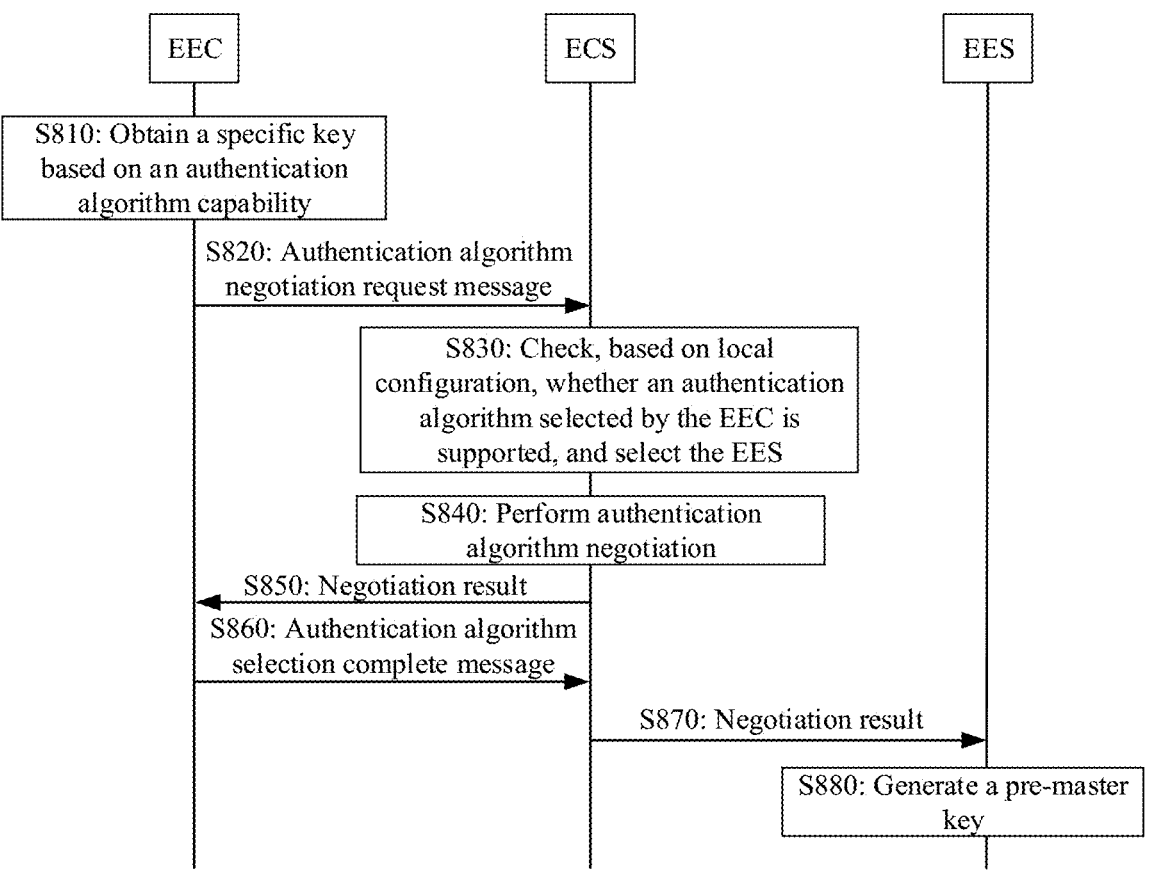
FIG. 8 is a schematic flowchart of a method for establishing a transport layer security protocol according to an embodiment of this application.

FIG. 8 a schematic flowchart of a method for establishing a transport layer security protocol according to an embodiment of this application. An authentication process of this method is based on clause 5.4.0.2 of TS 33.222. This embodiment of this application is mutual authentication between an EEC and an ECS based on a shared TLS key PSK. Algorithm information of an EES is already stored in the ECS, and an address (for example, a URI) of the ECS is already preconfigured in the EEC or is already discovered by the same. The method may include steps S810, S820, S830, S840, S850, S860, S870, and S880.

S810: The EEC obtains a specific key based on an authentication algorithm capability.

For example, when the EEC establishes a TLS connection to ECS, the EEC may choose to use PSK-based TLS authentication. If the EEC supports the use of AKMA, the EEC may perform an AKMA authentication process to obtain an ECS specific key "KAF". If the EEC supports the use of GBA, the EEC may perform a bootstrapping process with a BSF network element and obtain an ECS specific key "Ks_(ext)_NAF" or "Ks_int_NAF".

Further, the EEC may generate a TLS pre-master key PSK by using the ECS specific key. (Time for deriving the pre-master key is not limited in embodiments of this application).

In addition, the EEC may generate an EES specific key, and further generate an EES-specific TLS pre-master key (time for deriving the pre-master key is not limited in embodiments of this application).

S820: The EEC sends an authentication algorithm negotiation request message to the ECS.

When the EEC wants to establish a TLS connection to the ECS, the EEC may send an authentication algorithm negotiation request message (ClientHello Message) to the ECS, which may include an authentication algorithm selection message, that is, an authentication algorithm capability supported by a UE (for example, if the UE supports GBA, "3GPP-bootstrapping-uicc", "3GPP-bootstrapping", or "3GPP-bootstrapping-digest", and a corresponding B-TID may be sent; or if the UE supports AKMA, "3GPP-AKMA" and a corresponding A-KID may be sent). The message may include a UE identifier, such as a GPSI, connectivity information, a UE location, and AC profile information.

S830: The ECS checks, based on local configuration, whether an authentication algorithm selected by the EEC is supported, and selects an EES.

The ECS may check, based on local algorithm configuration and a received EEC authentication algorithm capability, whether the ECS supports the authentication algorithm selected by the EEC.

The ECS may identify the EES by using a capability (for example, a UE location) of a 3GPP core network or a profile provided by the EEC. The ECS may assist the EEC in negotiating with the identified EES about authentication. If algorithm information of the EES is already stored in the ECS, the ECS may use the capability (for example, the UE location) of the 3GPP core network or the profile provided by the EEC and the algorithm information of the EES to select an EES that supports authentication with the EEC.

S840: The ECS performs authentication algorithm negotiation.

If the ECS supports PSK-based TLS, the ECS may negotiate, based on local authentication algorithm configuration, with the EEC on a authentication algorithm for generating a PSK. In this case, the following cases may be included.

(a) If the EEC negotiates to use AKMA with the ECS, the ECS may retrieve a KAF from an AAnF by using a received A-KID.

(b) If the EEC negotiates to use GBA with the ECS, the ECS may retrieve Ks_(ext)_NAF or Ks_int_NAF from the BSF by using a received B-TID.

(c) If the negotiation fails, the ECS may generate a failure indication.

The ECS may generate a TLS pre-master key PSK by using a specific key Ks_(ext)_NAF, Ks_int_NAF, or KAF.

In addition, the ECS may perform an algorithm selection process for authentication with the EEC for the EES.

S850: The ECS sends a negotiation result to the EEC.

If the negotiation is successful, the ECS may send a ServerHello message (the message may include an authentication algorithm and the EES profile selected in step S830) to the EEC to assist in authentication between the EEC and the EES. If the negotiation fails, the ECS may send a failure indication to the EEC.

S860: The EEC sends an authentication algorithm selection complete message to the ECS.

S870: The ECS sends the negotiation result to the EES.

If the negotiation is successful, the ECS notifies the EES of the negotiation result. If the negotiation fails, the ECS sends a failure indication to the EES.

S880: The EES generates a pre-master key.

The EES checks, based on local algorithm configuration and a received EEC authentication algorithm capability, whether the EES supports the authentication algorithm selected by the EEC. In this case, the following cases may be included.

(a) If the EEC negotiates to use AKMA with the EES, the EES may retrieve a KAF from an AAnF by using a received A-KID.

(b) If the EEC negotiates to use GBA with the EES, the EES may retrieve Ks_(ext)_NAF or Ks_int_NAF from the BSF by using a received B-TID.

The EES may generate a TLS pre-master key PSK by using a specific key Ks_(ext)_NAF, Ks_int_NAF, or KAF.

Figure 9:
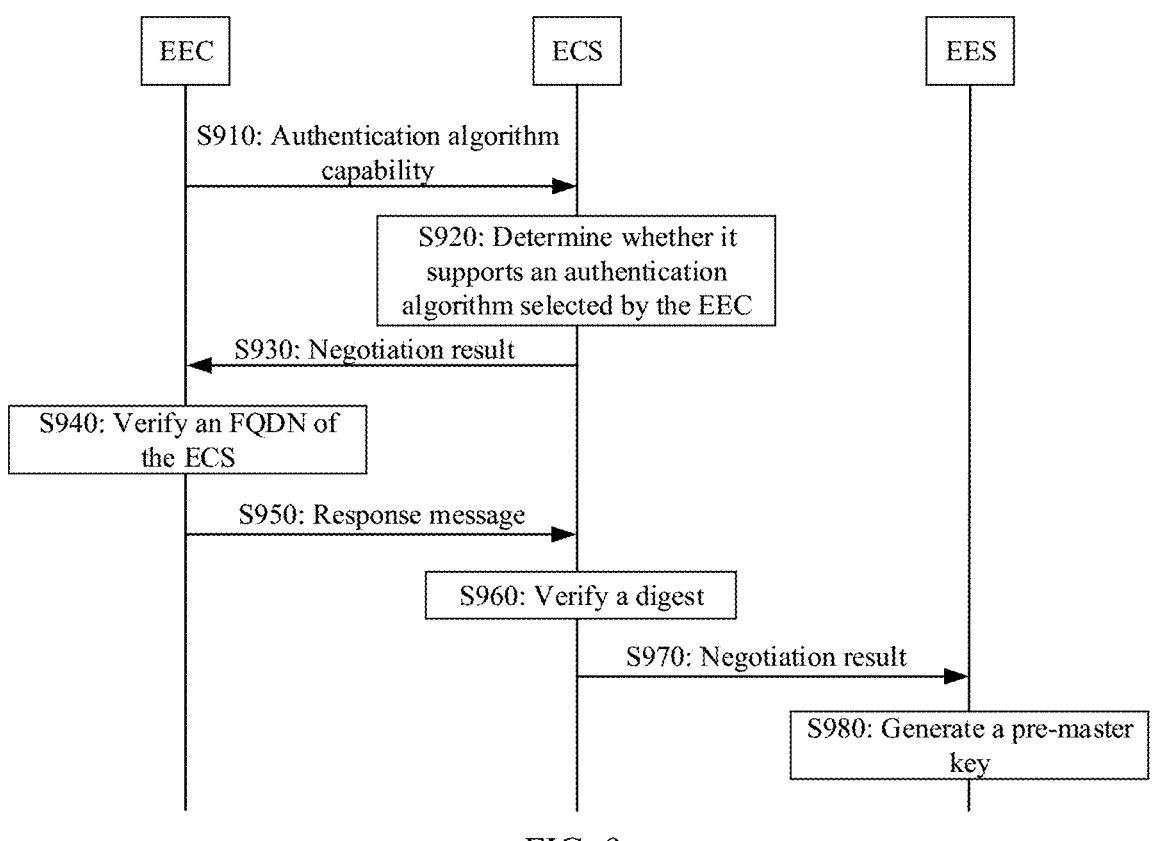
FIG. 9 is a schematic flowchart of a method for establishing a transport layer security protocol according to another embodiment of this application.

FIG. 9 is a schematic flowchart of a method for establishing a transport layer security protocol according to an embodiment of this application. An authentication process of this method is based on clause 5.3 of TS 33.222. This embodiment of this application refers to mutual authentication between an EEC and an ECS based on a shared TSL key PSK and an ECS certificate, where algorithm information of an EES is already stored in the ECS, and an address (for example, a URI) of the ECS is already preconfigured in the EEC or is already discovered by the EEC. The method may include steps S910, S920, S930, S940, S950, S960, S970, and S980.

S910: The EEC sends an authentication algorithm capability to the ECS.

If the EEC has established a TLS connection to the ECS based on the ECS certificate, the EEC may send a hypertext transfer protocol (HTTP) request to the ECS, which may include an EEC authentication algorithm capability that is identified by a pre-shared key identity hint (PSK-Identity hint). For example, the PSK-Identity hint may include "3GPP-bootstrapping-uicc", "3GPP-bootstrapping", "3GPP-bootstrapping-digest", or "3GPP-AKMA". The message may further include a UE identifier, such as a GPSI, connectivity information, a UE location, and AC profile information.

S920: The ECS determines whether it supports an authentication algorithm selected by the EEC.

The ECS may check, based on local algorithm configuration and a received EEC authentication algorithm capability, whether the ECS supports the authentication algorithm selected by the EEC. If negotiation fails, the ECS may generate a failure indication. In addition, the ECS may perform an algorithm selection process for authentication with the EEC for the EES.

If algorithm information of the EES is already stored in the ECS, the ECS may use a capability (for example, a UE location) of a 3GPP core network or a profile provided by the EEC and the algorithm information of the EES to select an EES that supports authentication with the EEC.

S930: The ECS sends a negotiation result to the EEC.

The ECS may send, to the EEC, a WWW-Authenticate header field, which may include a selected authentication algorithm identifier and an EES profile selected in step S920, or a failure indication.

S940: The EEC verifies an FQDN of the ECS.

The EEC verifies the FQDN of the ECS to which a TLS connection is established, which may be based on the received authentication algorithm identifier. If GBA is used, the EEC may perform a GBA process with a BSF network element to generate an ECS specific key Ks_(ext)_NAF or Ks_int_NAF and derive a TLS pre-master key PSK. If AKMA is used, the EEC may perform an AKMA process to generate an ECS specific key KAF and derive a PSK.

Similarly, the EEC may generate an EES specific key Ks_(ext)_NAF, Ks_int_NAF, or KAF, and derive a corresponding PSK.

S950: The EEC sends a response message to the ECS.

The EEC may send, to the ECS, the response message, which may include an authorization header field. If GBA is selected, a digest in the field may be calculated by using a B-TID as a user name and Ks_(ext)_NAF or Ks_int_NAF as a password. If AKMA is selected, the digest in the field may be calculated by using an A-KID as a user name and KAF as a password.

S960: The ECS verifies the digest.

After receiving the response message, the ECS may obtain a corresponding key based on the B-TID from a BSF network element, or based on the A-KID from an AAnF network element, to verify the digest.

S970: The ECS sends the negotiation result to the EES.

If the negotiation is successful, the ECS may notify the EES of the negotiation result. If the negotiation fails, the ECS sends a failure indication to the EES.

S980: The EES generates a pre-master key.

If the negotiation is successful, EES may obtain a corresponding key based on the B-TID from the BSF network element, or based on the A-KID from the AAnF network element, and derive a TLS pre-master key PSK.

Figure 10:
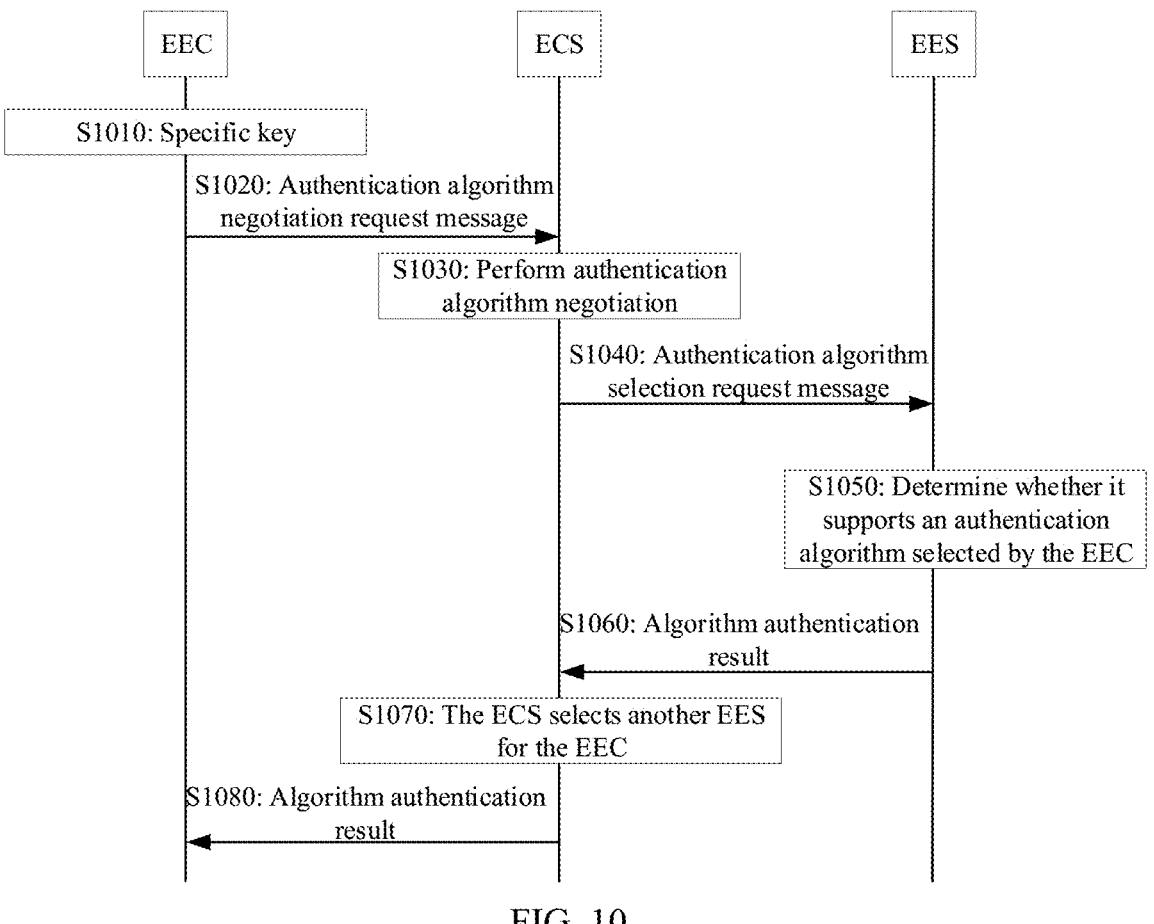
FIG. 10 is a schematic flowchart of a method for establishing a transport layer security protocol according to still another embodiment of this application.

FIG. 10 is a schematic flowchart of a method for establishing a transport layer security protocol according to an embodiment of this application. The method refers to mutual authentication between an EEC and an ECS based on a shared TLS key PSK, where an algorithm information of an EES is not stored in the ECS, and an address (for example, a URI) of the ECS is already preconfigured in the EEC or is already discovered by the EEC. The method may include steps S1010, S1020, S1030, S1040, S1050, S1060, S1070, and S1080.

S1010: The EEC obtains a specific key.

When the EEC establishes a TLS connection to the ECS, the EEC may choose to use PSK-based TLS authentication. If the EEC supports the use of AKMA, the EEC may perform an AKMA authentication process to obtain an ECS specific key "KAF". If the EEC supports the use of GBA, the EEC may perform a bootstrapping process with a BSF network element and obtain an ECS specific key "Ks_(ext) _NAF" or "Ks_int_NAF". Further, the UE may generate a TLS pre-master key PSK by using the ECS specific key.

Similarly, the EEC may generate an EES specific key, and further generate an EES-specific TLS pre-master key.

S1020: The EEC sends an authentication algorithm negotiation request message to the ECS.

The EEC may indicate, to the ECS by using a ClientHello message sent to the ECS, that the EEC supports a PSK-based TLS authentication. The message may include an EEC authentication algorithm capability, which is identified by a PSK-Identity hint (that is, "3GPP-bootstrapping-uicc", "3GPP-bootstrapping", "3GPP-bootstrapping-digest", or "3GPP-AKMA"), and is used to indicate an authentication algorithm capability of the EEC for generating a PSK. The message may include a UE identifier, such as a GPSI, connectivity information, a UE location, and AC profile information.

S1030: The ECS performs authentication algorithm negotiation.

If the ECS supports PSK-based TLS, the ECS may negotiate, based on local authentication algorithm configuration, with the EEC on an authentication algorithm for generating a PSK. In this case, the following cases may be included.

(a) If the EEC negotiates to use AKMA with the ECS, the ECS may retrieve a KAF from an AAnF network element by using a received A-KID.

(b) If the EEC negotiates to use GBA with the ECS, the ECS may retrieve Ks_(ext)_NAF or Ks_int_NAF from the BSF network element by using a received B-TID.

(c) If the negotiation fails, the ECS may generate a failure indication.

The ECS may generate a TLS pre-master key PSK by using a specific key Ks_(ext)_NAF, Ks_int_NAF, or KAF.

The ECS may perform an algorithm selection process for authentication with the EEC for the EES. If authentication algorithm information of the EES is not stored in the ECS, the ECS may send authentication algorithm information of the EEC to the EES, so that the EES may select authentication algorithm based on its own configuration.

S1040: The ECS sends an authentication algorithm selection request message to the EES.

The ECS may send, to the EES, an authentication algorithm selection request message, which may include an authentication algorithm capability PSK-Identity hint (that is, "3GPP-bootstrapping-uicc", "3GPP-bootstrapping", "3GPP-bootstrapping-digest", or "3GPP-AKMA") of the EEC.

S1050: The EES determines whether it supports an authentication algorithm selected by the EEC.

The EES may check, based on local algorithm configuration and a received EEC authentication algorithm capability, whether the ECS supports the authentication algorithm selected by the EEC. In this case, the following cases may be included.

(a) If the EEC negotiates to use AKMA with the EES, the EES may retrieve a KAF from an AAnF network element by using a received A-KID.

(b) If the EEC negotiates to use GBA with the EES, the EES may retrieve Ks_(ext)_NAF or Ks_int_NAF from a BSF network element by using a received B-TID.

(c) If the negotiation fails, the EES may generate a failure indication.

The EES may generate a TLS pre-master key PSK by using a specific key Ks_(ext)_NAF, Ks_int_NAF, or KAF.

S1060: The EES sends an algorithm authentication result to the ECS.

The EES may return a ServerHello message to the ECS, where the message may include a selected authentication algorithm identifier. Alternatively, the EES may send a failure indication.

S1070: The ECS selects another EES for the EEC.

If the ECS receives a failure indication from the EES, the ECS may select another EES for the EEC.

S1080: The ECS sends an algorithm authentication result to the EEC.

If the authentication algorithm selection process between the EEC and the ECS is successful, the ECS may send a ServerHello message to the EEC to indicate a selected authentication algorithm identifier; otherwise, the ECS may send an algorithm selection failure indication to the EEC.

If the ECS receives an authentication algorithm negotiation success message from the EES, the ECS may forward the ServerHello message of the EES to the EEC; otherwise, the ECS may forward the algorithm selection failure indication of the EES to the EEC.

Further, a TLS connection may be established between the EEC and the ECS and between the EEC and the EES by using the generated TLS pre-master key PSK.

Figure 11:
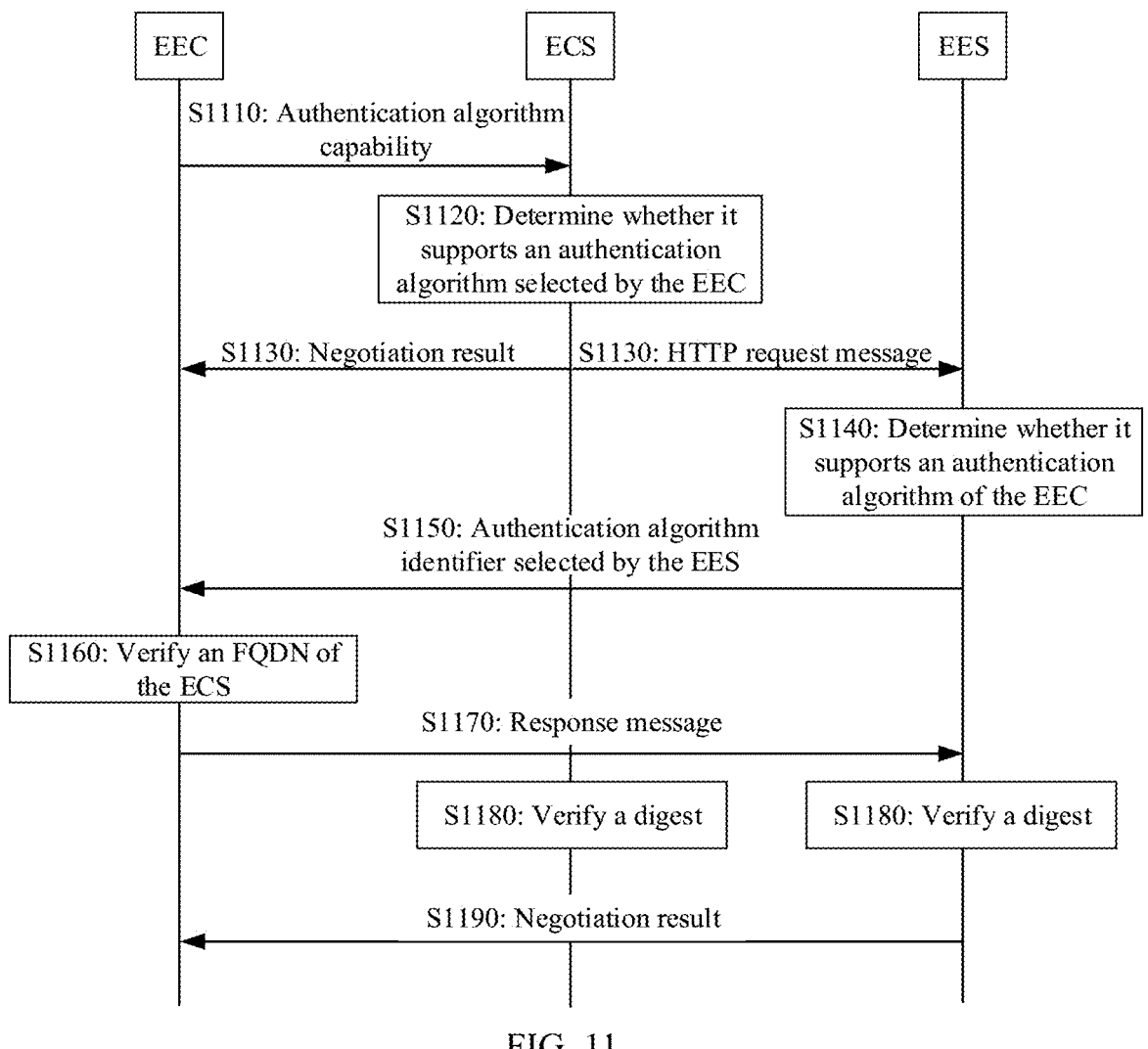
FIG. 11 is a schematic flowchart of a method for establishing a transport layer security protocol according to still another embodiment of this application.

FIG. 11 is a schematic flowchart of a method for establishing a transport layer security protocol according to an embodiment of this application. The method refers to mutual authentication between an EEC and an ECS based on a shared TSL key PSK and an ECS certificate, where an address (for example, a URI) of the ECS is already preconfigured in the EEC or is already discovered by the same. The method may include steps S1110, S1120, S1130, S1140, S1150, S1160, S1170, S1180, and S1190.

S1110: The EEC sends the authentication algorithm capability to the ECS.

If the EEC has established a TLS connection to the ECS based on the ECS certificate, the EEC may send, to the ECS, an HTTP request, which may include an EEC authentication algorithm capability, which is identified by a PSK-Identity hint (that is, "3GPP-bootstrapping-uicc", "3GPP-bootstrapping", "3GPP-bootstrapping-digest", or "3GPP-AKMA"). The message may include a UE identifier, such as a GPSI, connectivity information, a UE location, and AC profile information.

S1120: The ECS determines whether it supports an authentication algorithm selected by the EEC.

The ECS may check, based on local algorithm configuration and a received authentication algorithm capability selected by the EEC, whether the ECS supports the authentication algorithm selected by the EEC. If negotiation fails, the ECS may generate a failure indication.

The ECS may perform an algorithm selection process for authentication with the EEC for the EES. If authentication algorithm information of the EES is not stored in the ECS, the ECS may send authentication algorithm information of the EEC to the EES, so that the EES may select authentication algorithm based on its own configuration.

S1130: The ECS sends a negotiation result to the EEC, and sends an HTTP request message to the EES.

The ECS sends a WWW-Authenticate header field to the EEC, which includes a selected authentication algorithm identifier, or a failure indication. The ECS forwards an HTTP request of the EEC to the EES, where the request may include an authentication algorithm capability of the EEC.

S1140: The EES determines whether it supports an authentication algorithm of the EEC.

S1150: The EES sends an authentication algorithm identifier selected by the EES to the EEC.

The EES sends, to the EEC through the ECS, a WWW-Authenticate header field, which includes the authentication algorithm identifier selected by the EES, or a failure indication.

S1160: The EEC verifies an FQDN of the ECS.

The EEC verifies the FQDN of the ECS to which a TLS connection is established, which may be based on the received authentication algorithm identifier. If GBA is used, the EEC may perform a GBA process with a BSF network element to generate an ECS specific key Ks_(ext)_NAF or Ks_int_NAF and derives a TLS pre-master key PSK. If AKMA is used, the EEC may perform an AKMA process to generate an ECS specific key KAF and derive a PSK.

Similarly, the EEC generates an EES specific key Ks_(ext)_NAF, Ks_int_NAF, or KAF, and derives a corresponding PSK.

S1170: The EEC sends a response message to the EES.

The EEC may send, to the ECS, the response message, which may include an authorization header field. If GBA is selected, a digest in the field may be calculated by using a B-TID as a user name and Ks_(ext)_NAF or Ks_int_NAF as a password. If AKMA is selected, the digest in the field may be calculated by using an A-KID as a user name and KAF as a password.

The EEC may send the response message to the EES through the ECS.

S1180: The ECS and the EES verify the digest.

After receiving the message, the ECS may obtain a corresponding key from the BSF network element based on the B-TID, or from an AAnF network element based on the A-KID, to verify the digest. If the negotiation is successful, the ECS may notify the EES of the negotiation result. If the negotiation fails, the ECS may send a failure indication.

Similarly, the EES may verify the digest, and send a negotiation success message or a failure indication to the EEC through the ECS.

S1190: The EES sends a negotiation result to the EEC.

Figure 12:
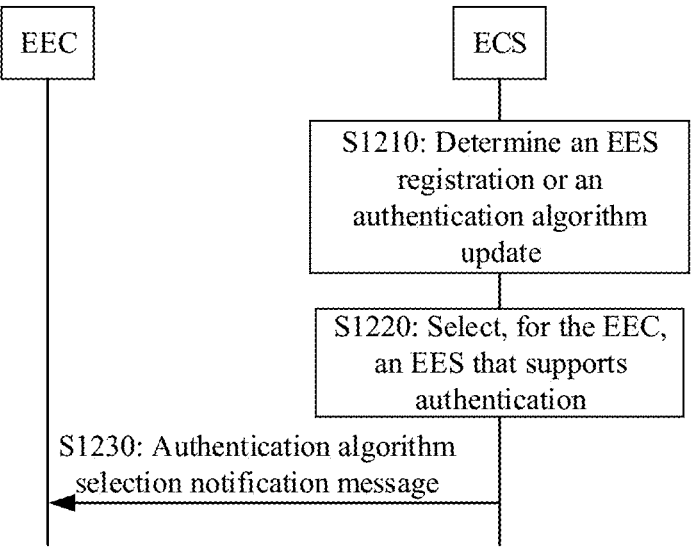
FIG. 12 is a schematic flowchart of a method for establishing a transport layer security protocol according to still another embodiment of this application.

FIG. 12 is a schematic flowchart of a method for establishing a transport layer security protocol according to an embodiment of this application. The method refers to mutual authentication between an EEC and an ECS based on a shared TSL key PSK and an ECS certificate, and an address (for example, a URI) of the ECS is already preconfigured in the EEC or is already discovered by the same. The method may include steps S1210, S1220, and S1230.

S1210: The ECS determines an EES registration or an authentication algorithm update.

In the following cases, the ECS may trigger notification about algorithm selection of an EES and address information of the EES to the EEC.

(a) The EES registers with the ECS, and the ECS may receive, in an EES registration message, an authentication algorithm supported by the EES.

(b) An authentication algorithm of the EES is updated by network configuration.

S1220: The ECS selects, for the EEC, an EES that supports authentication.

The ECS may check newly received or updated authentication algorithm information of the EES, and select, for the EEC based on a previously received authentication algorithm capability of the EEC, an EES that supports authentication with the EEC.

S1230: The ECS sends an authentication algorithm selection notification message to the EEC.

If the ECS has established a TLS connection to the EEC, the ECS may send, to the EEC through this connection, an authentication algorithm selection notification message, which may include address information of the selected EES.

Further, the EEC may perform key negotiation with the EES based on an address and authentication algorithm information of the EES, and further establish a TLS channel, to generate a TLS pre-master key PSK. For this process, reference may be made to the key negotiation process between the EEC and the EES in FIG. 8 to FIG. 12, and details are not described herein again.

Further, the method in embodiments of this application may also be applied to other scenarios. The following gives a detailed description with reference to FIG. 13 and FIG. 14.

In a 5G proximity services (ProSe) scenario, a discovery mechanism is needed for establishment of a connection between a plurality of UEs. In this case, the UE needs to establish a TLS secure channel with a DDNMF. In addition, in a UE-to-network relay scenario, a remote UE may establish a secure PC5 channel with a relay through a user plane-based authentication scheme. In this case, a PKMF may implement a key management function in this scenario. Therefore, the UE also needs to establish a TLS secure channel with the PKMF. Considering that the UE and the network element each support different security authentication algorithms, it is necessary to ensure that authentication algorithms used by both parties are consistent during establishment of a secure channel. This solution can achieve authentication algorithm selection between the UE and a direct discovery name management function (DDNMF) network element, and authentication algorithm selection between the UE and a ProSe key management function (PKMF) network element.

Figure 13:
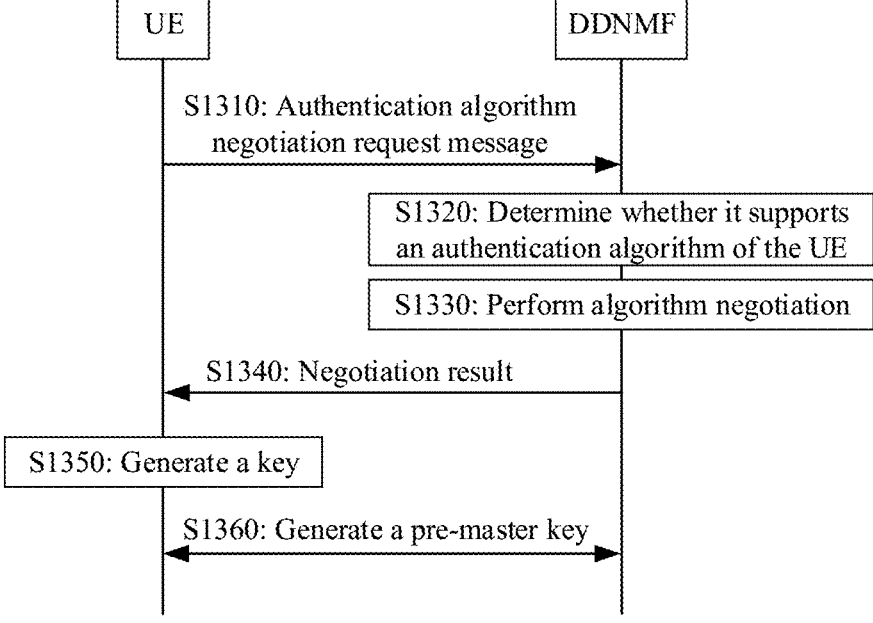
FIG. 13 is a schematic flowchart of a method for establishing a transport layer security protocol according to still another embodiment of this application.

FIG. 13 is a schematic flowchart of a method for establishing a transport layer security protocol according to an embodiment of this application. The method refers to a PSK-TLS-based authentication algorithm selection process between a UE and a DDNMF, and address information (such as FQDN or IP) of the DDNMF network element is already preconfigured in the UE. The method may include steps S1310, S1320, S1330, S1340, S1350, and S1360.

S1310: The UE sends an authentication algorithm negotiation request message to the DDNMF network element.

When the UE wants to establish a TLS connection to the DDNMF, the UE may send, to the DDNMF network element, a ClientHello message, which may include at least an authentication algorithm selection message (all authentication algorithm capabilities supported by the UE ("3GPP-bootstrapping-uicc", "3GPP-bootstrapping", "3GPP-bootstrapping-digest" with a corresponding B-TID, and "3GPP-AKMA" with a corresponding A-KID)).

S1320: The DDNMF network element determines whether it supports an authentication algorithm of the UE.

The DDNMF network element may select an authentication algorithm based on local algorithm configuration and a received UE authentication algorithm capability.

S1330: The DDNMF network element performs algorithm negotiation.

If AKMA is used through negotiation, the DDNMF network element may obtain K_AF from an AAnF by using an A-KID and derive a TLS key. If GBA is used through negotiation, the DDNMF network element may obtain Ks_(ext)_NAF or Ks_int_NAF from a BSF network element by using a B-TID and derive a TLS key. If the negotiation fails, the DDNMF network element may generate a failure indication Failure Indication and terminate the TLS connection.

S1340: The DDNMF network element sends a negotiation result to the UE.

If the negotiation is successful, the DDNMF may send a ServerHello message (including at least the selected authentication algorithm) to the UE to assist in authentication between the UE and DDNMF. If the negotiation fails, a failure indication can be returned to terminate the connection.

S1350: The UE generates a key.

The UE may check the selected authentication algorithm in the ServerHello message, and derive a TLS key based on the algorithm by using K_AF or Ks_(ext)_NAF or Ks_int_NAF.

S1360: The UE and the DDNMF network element generate a pre-master key.

The UE and the DDNMF may use the derived TLS key as the pre-master key PSK to perform a subsequent normal process based on the PSK-TLS 1.3 protocol.

A PSK-TLS-based authentication algorithm selection process between the UE and the PKMF network element is the same as the method in FIG. 13, and details are not described herein.

Figure 14:
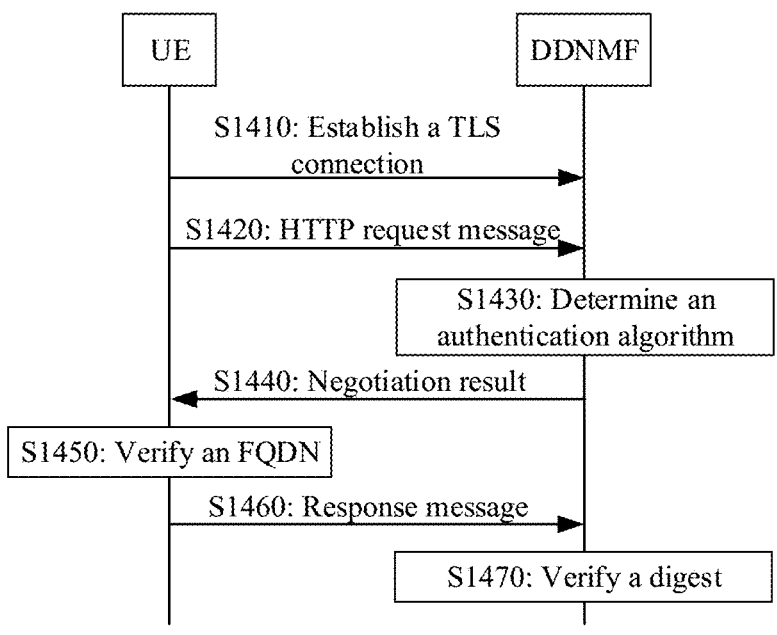
FIG. 14 is a schematic flowchart of a method for establishing a transport layer security protocol according to still another embodiment of this application.

FIG. 14 is a schematic flowchart of a method for establishing a transport layer security protocol according to an embodiment of this application. The method refers to an authentication algorithm selection process between a UE and a DDNMF based on a network element certificate-TLS, and address information (such as FQDN or IP) of the DDNMF network element is already preconfigured in the UE. An application layer protocol between the UE and the DDNMF network element uses an HTTP protocol, and the DDNMF network element is provided with a verifiable public key certificate. The method may include steps S1410, S1420, S1430, S1440, S1450, S1460, and S1470.

S1410: The UE establishes a TLS connection to the DDNMF network element.

The UE may establish a TLS connection to the DDNMF network element based on a DDNMF certificate.

S1420: The UE sends an HTTP request message to the DDNMF network element.

The UE may send, through a TLS secure channel, an HTTP request message, which may include at least an authentication algorithm selection message (authentication algorithm capabilities supported by the UE ("3GPP-bootstrapping-uicc", "3GPP-bootstrapping", "3GPP-bootstrapping-digest", and "3GPP-AKMA")).

S1430: The DDNMF network element determines an authentication algorithm.

The DDNMF network element may select an authentication algorithm based on local algorithm configuration and a received UE authentication algorithm capability. If negotiation fails, the DDNMF network element may generate a failure indication Failure Indication.

S1440: The DDNMF network element sends a negotiation result to the UE.

The DDNMF network element may send a WWW-Authenticate header field (including the negotiated authentication algorithm) or a failure indication to the UE.

S1450: The UE verifies an FQDN of the DDNMF network element.

The UE may verify the FQDN of the DDNMF network element to which the UE establishes a TLS connection.

S1460: The UE sends a response message to the DDNMF network element.

The UE may send, to the DDNMF network element, the response message, which may include an authorization header field.

If GBA is selected by the UE, a digest in the field may be calculated by using a B-TID as a user name and Ks_(ext)

_NAF or Ks_int_KAF as a password. If AKMA is selected by the UE, the digest in the field may be calculated by using an A-KID as a user name and KAF as a password.

S1470: The DDNMF network element verifies the digest.

After receiving the message, the DDNMF network element may obtain a corresponding key based on the B-TID from a BSF network element, or based on the A-KID from an AAnF network element, to verify the digest.

In this case, mutual authentication is achieved between the UE and the DDNMF network element.

An authentication algorithm selection process between the UE and the PKMF network element based on a network element certificate—TLS is the same as the method in FIG. 14, and details are not described herein.

The foregoing describes method embodiments of this application in detail with reference to FIG. 1 to FIG. 14. The following describes apparatus embodiments of this application in detail with reference to FIG. 15 to FIG. 18. It should be understood that the description of the method embodiments corresponds to the description of the apparatus embodiments, and therefore, for parts that are not described in detail, reference may be made to the foregoing method embodiments.

Figure 15:
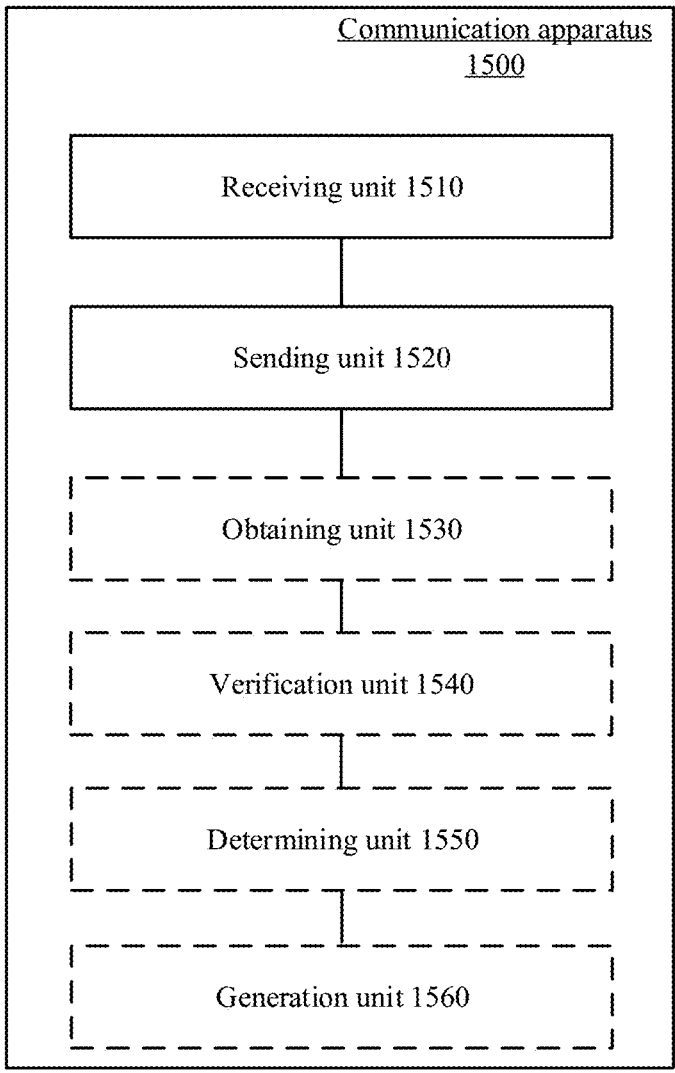
FIG. 15 is a schematic structural diagram of an apparatus for establishing a transport layer security protocol according to an embodiment of this application.

FIG. 15 is a schematic structural diagram of an apparatus for establishing a transport layer security protocol according to an embodiment of this application. As shown in FIG. 15, the apparatus 1500 includes a receiving unit 1510 and a sending unit 1520, which are specifically described as follows.

The receiving unit 1510 is configured to receive first negotiation request information from an edge enabler client EEC, where the first negotiation request information is used to indicate that the EEC supports a first authentication mode.

The sending unit 1520 is configured to: in a case that the apparatus supports the first authentication mode, send first negotiation response information to the EEC, where the first negotiation response information is used to indicate that the apparatus supports the first authentication mode.

Optionally, the receiving unit 1510 is further configured to receive first key information from the EEC, where the first key information includes identification information of a specific key in an authentication network element, the specific key is a specific key obtained during a process in which the EEC performs authentication on the authentication network element by using the first authentication mode, and the authentication network element is configured to implement authentication that is based on the first authentication mode. The apparatus further includes an obtaining unit 1530, configured to successfully obtain the specific key from the authentication network element based on the first key information.

Optionally, the sending unit 1520 is further configured to send a fully qualified domain name FQDN of the apparatus to the EEC. The receiving unit 1510 is further configured to receive second key information from the EEC, where the second key information includes identification information of a specific key and digest information, the digest information is generated by using the identification information of the specific key on an authentication network element as a user name and the specific key as a password, the specific key is a specific key obtained during a process in which the EEC performs authentication on the authentication network element by using the first authentication mode, and the authentication network element is configured to implement authentication that is based on the first authentication mode. The obtaining unit 1530 is further configured to obtain, from the authentication network element, the specific key identified by the second key information. The apparatus 1500 further includes a verification unit 1540, configured to successfully verify the digest information based on the specific key obtained from the authentication network element.

Optionally, the apparatus 1500 further includes a determining unit 1550, configured to determine whether there is an EES supporting the first authentication mode. The sending unit is 1520 specifically configured to: in a case that there is an EES supporting the first authentication mode, send the first negotiation response information to the EEC, and send EES indication information to the EEC, where the EES indication information is used to indicate a first EES, and the first EES is an EES supporting the first authentication mode.

Optionally, an authentication mode supported by each EES of at least one EES is configured in the apparatus; and the determining unit 1550 is specifically configured to: in a case that there is an EES supporting the first authentication mode in the at least one EES, determine that there is an EES supporting the first authentication mode, and the first EES is an EES supporting the first authentication mode in the at least one EES.

Optionally, the determining unit is 1550 specifically configured to: in a case that there is no EES supporting the first authentication mode in the at least one EES, determine that there is no EES supporting the first authentication mode.

Optionally, the sending unit is 1520 is specifically configured to send negotiation query request information to the first EES, where the negotiation query request information is used to indicate the first authentication mode. The receiving unit 1510 is specifically configured to receive negotiation query feedback information from the first EES, where the negotiation query feedback information is used to indicate whether the first EES supports the first authentication mode. The determining unit 1550 is specifically configured to: in a case that the negotiation query feedback information indicates that the first EES supports the first authentication mode, determine that there is an EES supporting the first authentication mode.

Optionally, the determining unit 1550 is specifically configured to: in a case that the negotiation query feedback information indicates that the first EES does not support the first authentication mode, determine that there is no EES supporting the first authentication mode.

Optionally, the sending unit 1520 is further configured to send fifth authentication mode information and third key information to the EES, where the fifth authentication mode information is used to indicate that the EEC supports the first authentication mode, and the third key information is used to indicate identification information of the specific key.

Optionally, the determining unit 1550 is further configured to: in a case that it is determined that there is no EES supporting the first authentication mode, determine that authentication mode negotiation fails.

Optionally, the determining unit 1550 is further configured to determine that EES information is updated, where the updated EES information includes an authentication mode supported by each EES of at least one updated EES; and re-determine the first EES for the EEC based on the updated EES information, where the re-determined first EES supports the first authentication mode. The sending unit 1520 is further configured to send authentication mode reselection notification information to the EEC, where the authentication mode reselection notification information is used for instructing the EEC to perform key negotiation with the re-determined first EES based on the first authentication mode.

Optionally, the determining unit 1550 is specifically configured to determine that the apparatus receives registration request information of a to-be-registered EES, where the registration request information carries an authentication mode supported by the to-be-registered EES.

Optionally, the determining unit 1550 is specifically configured to determine that the apparatus receives configuration update information sent by a network-side device, where the configuration update information is used to update an authentication mode supported by all or part of the at least one EES.

Optionally, the first authentication mode is an authentication mode based on a generic bootstrapping architecture GBA mechanism of transport layer security (TLS) protocol, the first key information includes a bootstrap transaction identifier B-TID of the specific key, and the specific key includes a GBA derived key or a GBA derived key stored in a universal integrated circuit card UICC.

Optionally, the first authentication mode is an authentication mode based on an authentication and key management for applications AKMA mechanism, the first key information includes an AKMA key identifier of the specific key, and the specific key includes an AKMA key.

Optionally, the apparatus 1500 further includes a generating unit 1560, configured to generate a pre-shared key of TLS between the apparatus and the EEC based on the specific key.

Optionally, the determining unit 1550 is further configured to: in a case that the apparatus does not support the first authentication mode, determine that the authentication mode negotiation fails.

Optionally, the sending unit 1520 is further configured to send authentication result indication information to the EEC, where the authentication result indication information is used to indicate that the authentication mode negotiation between the apparatus and the EEC fails.

Figure 16:
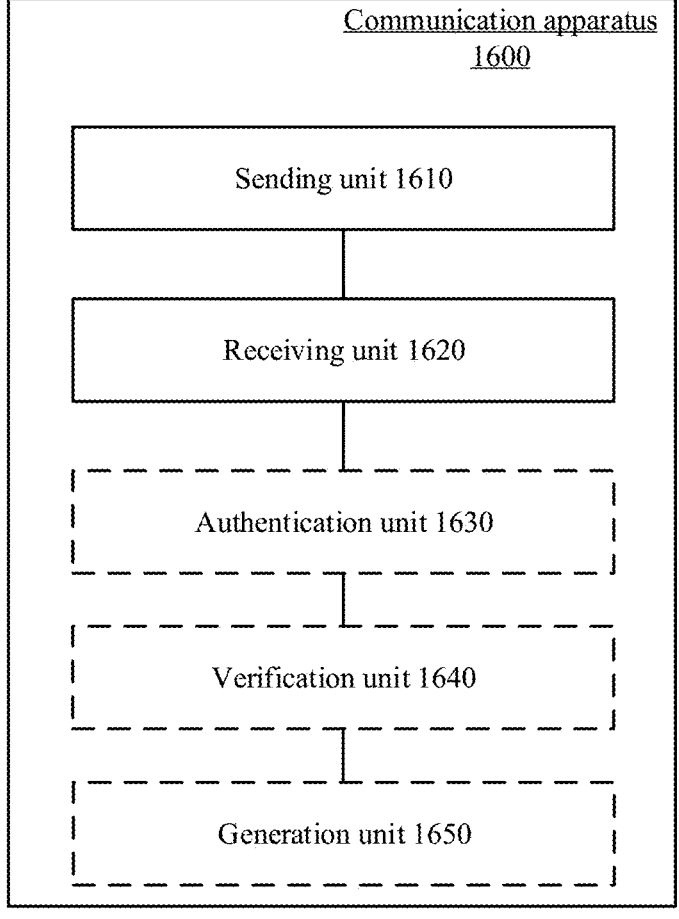
FIG. 16 is a schematic structural diagram of an apparatus for establishing a transport layer security protocol according to another embodiment of this application.

FIG. 16 is a schematic structural diagram of an apparatus for establishing a transport layer security protocol according to an embodiment of this application. As shown in FIG. 16, the apparatus 1600 includes a sending unit 1610 and a receiving unit 1620, which are specifically described as follows.

The sending unit 1610 is configured to send first negotiation request information to an edge configuration server ECS, where the first negotiation request information is used to indicate that the apparatus supports a first authentication mode.

The receiving unit 1620 is configured to receive first negotiation response information from the ECS, where the first negotiation response information is used to indicate that the ECS supports the first authentication mode.

Optionally, the apparatus 1600 further includes an authentication unit 1630, configured to perform authentication on an authentication network element based on the first authentication mode to obtain a specific key, where the authentication network element is configured to implement authentication that is based on the first authentication mode. The sending unit 1610 is further configured to send first key information to the ECS, where the first key information includes identification information of the specific key in the authentication network element.

Optionally, the receiving unit 1620 is further configured to receive an FQDN from the ECS. The apparatus 1600 further includes a verification unit 1640, configured to verify the ECS based on the FQDN. The sending unit 1610 is further configured to: in a case that the apparatus successfully verifies the ECS based on the FQDN, send second key information to the ECS, where the second key information includes a specific key and digest information, the digest information is generated by using identification information of the specific key on an authentication network element as a user name and the specific key as a password, the specific key is a specific key obtained during a process in which the apparatus performs authentication on the authentication network element by using the first authentication mode, and the authentication network element is configured to implement authentication that is based on the first authentication mode.

Optionally, the receiving unit 1620 is further configured to receive EES indication information from the ECS, where the EES indication information is used to indicate a first EES, and the first EES is an EES supporting the first authentication mode.

Optionally, the first authentication mode is an authentication mode based on a generic bootstrapping architecture GBA mechanism of transport layer security protocol TLS, the first key information includes a bootstrap transaction identifier B-TID of the specific key, and the specific key includes a GBA derived key or a GBA derived key stored in a universal integrated circuit card UICC.

Optionally, the first authentication mode is an authentication mode based on an authentication and key management for applications AKMA mechanism, the first key information includes an AKMA key identifier of the specific key, and the specific key includes an AKMA key.

Optionally, the apparatus 1600 further includes a generation unit 1650, configured to generate a pre-shared key of TLS between the ECS and the apparatus based on the specific key.

Optionally, the sending unit 1610 is further configured to send sixth authentication mode information to the ECS, where the sixth authentication mode information is used to indicate that the ECS supports a second authentication mode. The receiving unit 1620 is further configured to receive authentication result indication information from the ECS, where the authentication result indication information is used to indicate that authentication mode negotiation between the ECS and the apparatus fails.

Optionally, the receiving unit 1620 is further configured to receive authentication mode reselection notification information from the ECS, where the authentication mode reselection notification information is used for instructing the apparatus to perform, based on the first authentication mode, key negotiation with the first EES re-determined by the ECS.

Figure 17:
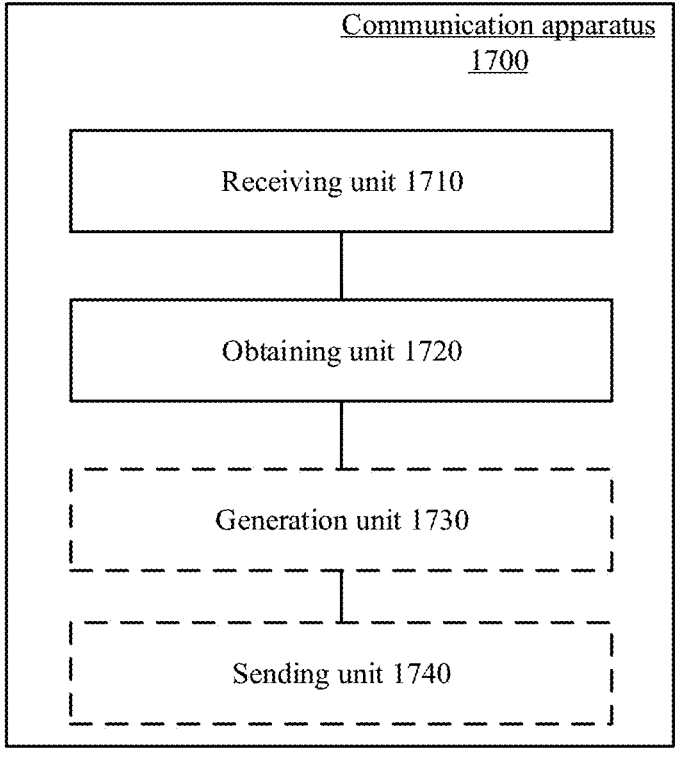
FIG. 17 is a schematic structural diagram of an apparatus for establishing a transport layer security protocol according to still another embodiment of this application.

FIG. 17 is a schematic structural diagram of an apparatus for establishing a transport layer security protocol according to an embodiment of this application. As shown in FIG. 17, the apparatus 1700 includes a receiving unit 1710 and an obtaining unit 1720, which are specifically described as follows.

The receiving unit 1710 is configured to receive fifth authentication mode information and third key information from an edge configuration server ECS, where the fifth authentication mode information is used to indicate that a first EEC supports a first authentication mode, an authentication mode supported by the ECS includes the first authentication mode, an authentication mode supported by the apparatus includes the first authentication mode, the third key information is used to indicate identification information of a specific key in an authentication network element, the specific key is a specific key obtained during a process in which the EEC performs authentication on the authentication network element by using the first authentication mode, and the authentication network element is configured to implement authentication that is based on the first authentication mode.

The obtaining unit 1720 is configured to obtain the specific key from the authentication network element based on the third key information.

Optionally, the apparatus 1700 further includes a generation unit 1730, configured to generate a pre-shared key of TLS between the ECS and the apparatus based on the specific key.

Optionally, the receiving unit 1710 is further configured to receive negotiation query request information from the ECS, where the negotiation query request information is used to indicate the first authentication mode.

The apparatus 1700 further includes a sending unit 1740, configured to send negotiation query feedback information to the ECS, where the negotiation query feedback information is used to indicate that the apparatus supports the first authentication mode.

Optionally, the first authentication mode is an authentication mode based on a generic bootstrapping architecture GBA mechanism of transport layer security protocol TLS, the first key information includes a bootstrapping transaction identifier B-TID of the specific key, and the specific key includes a GBA derived key or a GBA derived key stored in a universal integrated circuit card UICC.

Optionally, the first authentication mode is an authentication mode based on an authentication and key management for applications AKMA mechanism, the first key information includes an AKMA key identifier of the specific key, and the specific key includes an AKMA key.

Optionally, the receiving unit 1710 is further configured to receive seventh authentication mode information from the ECS, where the seventh authentication mode information is used to indicate a second authentication mode. The sending unit 1740 is further configured to: in a case that the apparatus does not support the second authentication mode, send eighth authentication mode information to the ECS, where the eighth authentication mode information is used to indicate that the apparatus does not support the second authentication mode.

Figure 18:
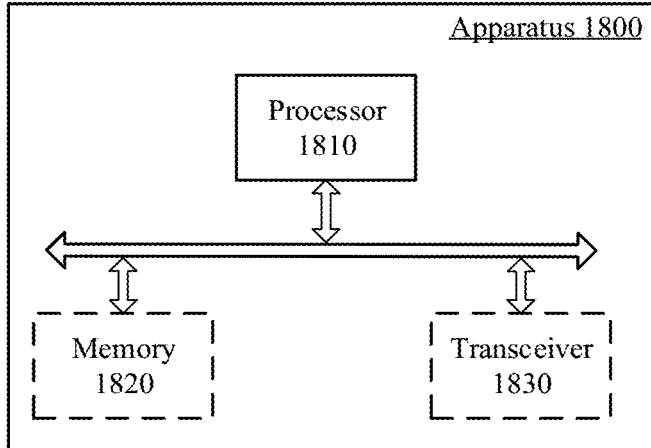
FIG. 18 is a schematic structural diagram of an apparatus according to an embodiment of this application.

FIG. 18 is a schematic structural diagram of an apparatus according to an embodiment of this application. The dashed lines in FIG. 18 indicate that the unit or module is optional. The apparatus 1800 may be configured to implement the methods described in the method embodiments. The apparatus 1800 may be a chip or an apparatus for establishing a transport layer security protocol.

The apparatus 1800 may include one or more processors 1810. The processor 1810 may allow the apparatus 1800 to implement the methods described in the foregoing method embodiments. The processor 1810 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1000 may further include one or more memories 1820. The memory 1820 stores a program that may be executed by the processor 1810 to cause the processor 1810 to perform the methods described in the foregoing method embodiments. The memory 1820 may be independent of the processor 1810 or may be integrated into the processor 1810.

The apparatus 1800 may further include a transceiver 1830. The processor 1810 may communicate with another device or chip through the transceiver 1830. For example, the processor 1810 may send and receive data to and from another device or chip through the transceiver 1830.

An embodiment of this application further provides a computer-readable storage medium for storing a program. The computer-readable storage medium may be applied to the apparatus for establishing a transport layer security protocol provided in embodiments of this application, and the program causes a computer to perform the methods performed by the apparatus for establishing a transport layer security protocol in embodiments of this application.

An embodiment of this application further provides a computer program product. The computer program product includes a program. The computer program product may be applied to the apparatus for establishing a transport layer security protocol provided in embodiments of this application, and the program causes a computer to perform the methods performed by the apparatus for establishing a transport layer security protocol in embodiments of this application.

An embodiment of this application further provides a computer program. The computer program may be applied to the apparatus for establishing a transport layer security protocol provided in embodiments of this application, and the computer program causes a computer to perform the methods performed by the apparatus for establishing a transport layer security protocol in embodiments of this application.

It should be understood that, in the embodiments of this application, "B that is corresponding to A" means that B is associated with A, and B may be determined based on A. However, it should be further understood that, determining B based on A does not mean determining B based only on A, but instead B may be determined based on A and/or other information.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

It should be understood that, in the embodiments of this application, sequence numbers of the foregoing processes do not mean execution sequences. The execution sequences of the processes should be determined according to functions and internal logic of the processes, and thus the sequence numbers of the foregoing processes should not be construed as any limitation on the implementation processes of the embodiments of this application.

In several embodiments provided in this application, it should be understood that, the disclosed system, apparatus, and method may be implemented in other manners. For example, the apparatus embodiments as described above are merely examples. For example, the unit division is merely logical function division and there may be other division manners in actual implementation. For example, a plurality of units or components may be combined or integrated into another system, or some features may be ignored or not performed. In addition, it should be noted that the foregoing displayed or discussed mutual coupling or direct coupling or communication connections may be implemented by indirect couplings or communication connections using some interfaces, apparatuses or units, and may be implemented in electrical, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, functional units in embodiments of this application may be integrated into one processing unit, or each of the units may exist solely and physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (for example, a coaxial cable, an optical fiber, and a digital subscriber line (DSL)) manner or a wireless (for example, infrared, radio, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for establishing a transport layer security protocol, comprising:

receiving, by an edge configuration server (ECS), first negotiation request information from an edge enabler client (EEC), wherein the first negotiation request information is used to indicate that the EEC supports a first authentication mode;

in a case that the ECS supports the first authentication mode, sending, by the ECS, first negotiation response information to the EEC, wherein the first negotiation response information is used to indicate that the ECS supports the first authentication mode;

sending, by the ECS, EES indication information to the EEC, wherein the EES indication information is used to indicate a first EES, wherein the first EES is an EES selected by the ECS for the EEC;

receiving, by the ECS, first key information from the EEC, wherein the first key information comprises identification information of a specific key in an authentication network element, the specific key is a specific key obtained during a process in which the EEC performs authentication on the authentication network element by using the first authentication mode, and the authentication network element is configured to implement authentication that is based on the first authentication mode; and obtaining, by the ECS, the specific key from the authentication network element based on the first key information.

2. The method according to claim 1, wherein the method further comprises:

sending, by the ECS, a fully qualified domain name (FQDN) of the ECS to the EEC;

receiving, by the ECS, second key information from the EEC, wherein the second key information comprises identification information of a specific key and digest information, the digest information is generated by using the identification information of the specific key on an authentication network element as a user name and the specific key as a password, the specific key is a specific key obtained during a process in which the EEC performs authentication on the authentication network element by using the first authentication mode, and the authentication network element is configured to implement authentication that is based on the first authentication mode;

obtaining, by the ECS from the authentication network element, the specific key identified by the second key information; and successfully verifying, by the ECS, the digest information based on the specific key obtained from the authentication network element.

3. The method according to claim 1, wherein an authentication mode supported by each EES of at least one EES is configured in the ECS.

4. An apparatus for establishing a transport layer security protocol, comprising a processor and a memory, wherein the memory is configured to store a computer program, and the processor is configured to invoke and run the computer program stored in the memory to cause the apparatus device to:

receive first negotiation request information from an edge enabler client (EEC), wherein the first negotiation request information is used to indicate that the EEC supports a first authentication mode;

in a case that the apparatus supports the first authentication mode, send first negotiation response information to the EEC, wherein the first negotiation response information is used to indicate that the apparatus supports the first authentication mode;

send EES indication information to the EEC, wherein the EES indication information is used to indicate a first EES, wherein the first EES is an EES selected by the ECS for the EEC;

receive first key information from the EEC, wherein the first key information comprises identification information of a specific key in an authentication network element, the specific key is a specific key obtained during a process in which the EEC performs authentication on the authentication network element by using the first authentication mode, and the authentication network element is configured to implement authentication that is based on the first authentication mode; and obtain the specific key from the authentication network element based on the first key information.

5. The apparatus according to claim 4, wherein an authentication mode supported by each EES of at least one EES is configured in the apparatus.

6. An apparatus for establishing a transport layer security protocol, comprising a processor and a memory, wherein the memory is configured to store a computer program, and the processor is configured to invoke and run the computer program stored in the memory to cause the apparatus device to:

send first negotiation request information to an edge configuration server (ECS), wherein the first negotiation request information is used to indicate that the apparatus supports a first authentication mode;

receive first negotiation response information from the ECS, wherein the first negotiation response information is used to indicate that the ECS supports the first authentication mode;

receive EES indication information from the ECS, wherein the EES indication information is used to indicate a first EES, wherein the first EES is an EES selected by the ECS for the EEC;

perform authentication on an authentication network element based on the first authentication mode to obtain a specific key, wherein the authentication network element is configured to implement authentication that is based on the first authentication mode; and send first key information to the ECS, wherein the first key information comprises identification information of the specific key in the authentication network element, the first key information is used by the ECS to obtain the specific key from the authentication network element.

7. The apparatus according to claim 6, wherein the processor is configured to invoke and run the computer program stored in the memory to cause the apparatus device to:

receive a fully qualified domain name (FQDN) from the ECS;

verify the ECS based on the FQDN; and in a case that the apparatus successfully verifies the ECS based on the FQDN, send second key information to the ECS, wherein the second key information comprises a specific key and digest information, the digest information is generated by using identification information of the specific key on an authentication network element as a user name and the specific key as a password, the specific key is a specific key obtained during a process in which the apparatus performs authentication on the authentication network element by using the first authentication mode, and the authentication network element is configured to implement authentication that is based on the first authentication mode.

8. The apparatus according to claim 6, wherein the first authentication mode is an authentication mode based on a generic bootstrapping architecture (GBA) mechanism of transport layer security (TLS) protocol, the first key information comprises a bootstrapping transaction identifier B-TID of the specific key, and the specific key comprises a GBA derived key or a GBA derived key stored in a universal integrated circuit card (UICC).

9. The apparatus according to claim 6, wherein the first authentication mode is an authentication mode based on an authentication and key management for applications (AKMA) mechanism, the first key information comprises an AKMA key identifier of the specific key, and the specific key comprises an AKMA key.

10. The apparatus according to claim 6, wherein the processor is configured to invoke and run the computer program stored in the memory to cause the apparatus device to:

generate a pre-shared key of TLS between the ECS and the apparatus based on the specific key.

11. The apparatus according to claim 6, wherein the processor is configured to invoke and run the computer program stored in the memory to cause the apparatus device to:

send sixth authentication mode information to the ECS, wherein the sixth authentication mode information is used to indicate that the apparatus supports a second authentication mode; and receive authentication result indication information from the ECS, wherein the authentication result indication information is used to indicate that authentication mode negotiation between the ECS and the apparatus fails.

* * * * *